United States Patent
Chang

(10) Patent No.: US 9,383,811 B2
(45) Date of Patent: Jul. 5, 2016

(54) PROCESSOR BRIDGING IN HETEROGENEOUS COMPUTER SYSTEM

(75) Inventor: Teng-Chang Chang, Taipei (TW)

(73) Assignee: Institute For Information Industry, Taipei (TW)

( * ) Notice: Subject to any disclaimer, the term of this patent is extended or adjusted under 35 U.S.C. 154(b) by 469 days.

(21) Appl. No.: 13/301,358

(22) Filed: Nov. 21, 2011

(65) Prior Publication Data

US 2012/0317321 A1  Dec. 13, 2012

Related U.S. Application Data

(60) Provisional application No. 61/494,587, filed on Jun. 8, 2011.

(51) Int. Cl.
| | |
|---|---|
| *G06F 13/14* | (2006.01) |
| *G06F 1/32* | (2006.01) |
| *G06F 9/455* | (2006.01) |

(52) U.S. Cl.
CPC .......... *G06F 1/3293* (2013.01); *G06F 9/45533* (2013.01); *Y02B 60/121* (2013.01); *Y02B 60/146* (2013.01); *Y02B 60/148* (2013.01)

(58) Field of Classification Search
CPC ............ G06F 13/4027; G06F 13/4022; G06F 9/45558; G06F 21/85
USPC .......... 710/305–306, 100, 316–317; 718/100; 713/300–340
See application file for complete search history.

(56) References Cited

U.S. PATENT DOCUMENTS

| | | | |
|---|---|---|---|
| 6,021,484 A | 2/2000 | Park | |
| 6,631,474 B1 * | 10/2003 | Cai et al. | ........................ 713/300 |

(Continued)

FOREIGN PATENT DOCUMENTS

| | | |
|---|---|---|
| EP | 1249764 A2 | 10/2002 |
| EP | 2157507 A1 | 2/2010 |

(Continued)

OTHER PUBLICATIONS

Combined Search and Examination Report rendered to the GB corresponding patent application U.S. Appl. No. 13/301,280, whose inventor is the same as the subject present application, Mar. 16, 2012; 8 pages.

(Continued)

*Primary Examiner* — Tim T Vo
*Assistant Examiner* — Kim T. Huynh
(74) *Attorney, Agent, or Firm* — Skaar Ulbrich Macari, P.A.

(57) ABSTRACT

A bridge logic device for a heterogeneous computer system that has at least one performance processor, a processor supporting logic supporting the at least one performance processor to execute tasks of the software, and a hypervisor processor consuming less power than the at least one performance processor is disclosed. The bridge logic device comprises a hypervisor operation logic that maintains status of the system under the at least one performance processor; a processor language translator logic that translates between processor languages of the at least one performance and the hypervisor processors; and a high-speed bus switch that has first, second and third ports for relaying data across any two of the three ports bidirectionally. The switch is connected to the at least one performance processor, the hypervisor processor via the processor language translator logic, and to the processor supporting logic respectively at the first, second, and third port.

11 Claims, 21 Drawing Sheets

(56) References Cited

U.S. PATENT DOCUMENTS

| | | | |
|---|---|---|---|
| 7,098,899 B1 | 8/2006 | Ginosar | |
| 2002/0173344 A1* | 11/2002 | Cupps et al. | 455/566 |
| 2008/0052504 A1 | 2/2008 | Tsuji et al. | |
| 2008/0244227 A1 | 10/2008 | Gee et al. | |
| 2008/0263324 A1 | 10/2008 | Sutardja et al. | |
| 2009/0222654 A1* | 9/2009 | Hum et al. | 713/100 |
| 2010/0005474 A1* | 1/2010 | Sprangle et al. | 718/104 |
| 2010/0185833 A1* | 7/2010 | Saito et al. | 712/203 |
| 2011/0055434 A1 | 3/2011 | Pyers et al. | |
| 2011/0113426 A1 | 5/2011 | Kung et al. | |

FOREIGN PATENT DOCUMENTS

| | | | |
|---|---|---|---|
| JP | 2000222080 A | 8/2000 | |
| JP | 2002312335 A | 10/2002 | |
| JP | 2004157865 A | 6/2004 | |
| JP | 2004280378 A | 10/2004 | |
| JP | 2009230220 A | 10/2009 | |
| WO | 9961981 A1 | 12/1999 | |
| WO | 02075517 A2 | 9/2002 | |
| WO | 2005062180 A1 | 7/2005 | |
| WO | WO2005/062180 * | 7/2005 | |
| WO | 2007081218 A1 | 7/2007 | |
| WO | WO2007081218 * | 7/2007 | G06F 1/32 |
| WO | 2010065325 A1 | 6/2010 | |

OTHER PUBLICATIONS

Combined Search and Examination Report rendered to the GB corresponding patent application U.S. Appl. No. 13/301,313, whose inventor is the same as the subject present application, Mar. 16, 2012, 7 pages.

Combined Search and Examination Report rendered to the GB corresponding patent application of subject patent application, Mar. 16, 2012, 5 pages.

Combined Search and Examination Report rendered to the GB corresponding patent application GB 1119875.1 of U.S. Appl. No. 13/301,386, whose inventor is the same as the subject present application, Mar. 16, 2012, 10 pages.

OA1: The Office Action issued by the JP Patent Office for the JP counterpart to U.S. Appl. No. 13/301,280, whose inventor is the same as the present patent application, May 1, 2013, 7 pages including translation.

OA2: The Office Action issued by the JP Patent Office for the JP counterpart to U.S. Appl. No. 13/301,313, whose inventor is the same as the present patent application, May 7, 2013, 7 pages including translation.

OA3: The Office Action issued by the JP Patent Office for the JP counterpart to the present patent application, Jul. 2, 2013, 8 pages including translation.

OA4: The Office Action issued by the JP Patent Office for the JP counterpart to U.S. Appl. No. 13/301,386, whose inventor is the same as the present patent application, May 23, 2013, 8 pages including translation.

OA5: The Office Action issued by the KR Patent Office for the KR counterpart to U.S. Appl. No. 13/301,280, whose inventor is the same as the present patent application, May 23, 2013, 12 pages including translation.

OA6: The Office Action issued by the KR Patent Office for the KR counterpart to U.S. Appl. No. 13/301,313, whose inventor is the same as the present patent application, May 24, 2013, 9 pages including translation.

OA7: The Office Action issued by the KR Patent Office for the KR counterpart to the present patent application, Jun. 28, 2013, 10 pages including translation.

OA8: The Office Action issued by the KR Patent Office for the KR counterpart to U.S. Appl. No. 13/301,386, whose inventor is the same as the present patent application, May 21, 2013, 13 pages including translation.

OA9: The USPTO Office Action for U.S. Appl. No. 13/301,313, whose inventor is the same as the present patent application, Jun. 27, 2013, 15 pages.

Office Action issued by the USPTO for U.S. Appl. No. 13/301,313, whose inventor is the same as the present patent application, May 28, 2014, 13 pages.

ER1: The Examination Report rendered to the GB corresponding patent application of U.S. Appl. No. 13/301,280, whose inventor is the same as the subject present application, Jan. 17, 2014, 7 pages.

ER2: The Examination Report rendered to the GB corresponding patent application of U.S. Appl. No. 13/301,386, whose inventor is the same as the subject present application, Jan. 17, 2014, 5 pages.

* cited by examiner

PROCESSOR BRIDGING IN HETEROGENEOUS COMPUTER SYSTEM

PRIORITY

This application claims the benefit of priority based on U.S. Provisional Application Ser. No. 61/494,587 filed on Jun. 8, 2011, which is hereby incorporated by reference in its entirety.

FIELD

The present invention relates in general to green computing, the minimization of computing power consumption. In particular, the present invention relates to a bridge logic device for a heterogeneous computer having a low-power master processor added to standard x86 architecture via the bridging logic to make a heterogeneous system for performance computing at minimized computing power consumption.

BACKGROUND

Computers of various sorts have become an indispensable equipment of modern civilization. Intel x86 (original architecture designed by Intel Corp. of Santa Clara, Calif. and evolved into the latest 64-bit CISC architecture by Advanced Micro Devices, Inc. of Sunnyvale, Calif.) has long dominated mainstream computing. Meanwhile, the world of non-x86 computing of commercial significance is currently dominated by the ARM processor (of the RISC ARM architecture developed by the ARM Holdings plc of Cambridge, United Kingdom) in mobile computing devices that include smart phones and touch-screen devices. From the perspective of green computing, problems of both x86 and non-x86 computing are as follows.

There is the need for green computing to cut x86 desktop idling power consumption. x86 computing is good for applications requiring computing power. With a global installation base of hundreds of millions of home and office desktop and portable computers, professional high-performance workstation computers, and server computers for various net-based commerce, computing energy consumption has become an environmental issue. One of the main issues is with computing idling—times when a computer is not used but not shut down.

There are power reduction efforts such as the Energy Star, an international standard originated in the United States and adopted by many other countries that achieve some level of computing power saving. The x86-based mainstream computer industry also has standard power management. For example, the Advanced Configuration and Power Interface (ACPI), an open industry standard, allows an operating system to implement direct control of the power-saving features of the computer hardware.

However, it is frequently difficult for x86-based mainstream desktops and laptops to achieve real green operation for most users due to inconvenience and limited power management built in. For many computer users, the sleep/standby/hibernation power management modes of the ACPI may be complicated to comprehend less finding a way to adjust for a best parameter setting for a computer to be both convenient to use and power-saving. Meanwhile, for more sophisticated computing such as that involving multiple sessions of virtual computing, instead of a smooth power management, ACPI is more prone to either crashing the computer or having difficulty in dealing with the VM sessions.

Thus, there is plenty of room for significant energy conservation by desktops due to their huge number.

There is the need for green computing to make x86-based smart mobile device practical. Also because of the imperfection of the available power management technology in the standard x86 world, x86-based smart personal devices (for example, x86-based cell phones) have so short battery life to be practical. In fact, no rigorous commercial x86-based smart phone is in existence. Most x86-based laptop computers have problem sustaining one whole hard-working day on battery out on the road. The result is the inconvenience of x86 application software access when out of office or home.

There is the need for non-x86 device to access x86 software base. The ARM processor has been developed for power-conserving applications necessary for mobile, especially smart phone applications. But, it is just not for serious computational applications. And essentially it has no practical direct access to the x86 software base. As Windows software remains to be the dominant in many aspects of daily life and business, non-x86's difficulty in access to x86 applications spells an inconvenience. Users either out on the road or in office need to have both hardware at hand to be able to have access to both the ARM-dominant mobile and x86-dominant Windows applications.

There is the need for a cross-OS computer system for simultaneous, integrated and seamless access to mixed applications. As the access to both x86 Windows and ARM smart phone applications become more a daily necessity for many, the need for a computer device that provides simultaneous access to both becomes real. Current x86-based architecture (and some other non-x86) allows for the execution of Windows and non-Windows software applications simultaneously on the same computer hardware through virtual computing technology. For example, an x86 computer can have either a Linux, a Windows or other host operating system that supports a number of guest virtual computers each running one of a different number of the supported operating systems. However, the emulation by the host processor of the instruction sets of other non-x86 guest OS consumes processing power. While this is acceptable for desktops, it is not for smart mobile devices for the obvious reason of battery life.

In an attempt to combine the functionalities of cell phone and a personal computer among other devices, Cupps et al. disclose an electronic device in a series of U.S. Patents and Applications that combines the hardware of an x86-based architecture and an ARM processor-based embedded system. For example, in US2002/0173344 "Novel personal electronic device," Cupps et al. describe a device that uses a low-powered system processor such as an ARM to serve as the system controller of the entire device that is essentially an x86-based computer.

The Cupps et al. electronic device is one that essentially has a cell phone-capable embedded ARM processor inserted into an x86 computer having its own PC processor. The ARM is connected to the North and South Bridges of the x86 architecture in the same way the original PC processor does. Cupps et al. describe that the low-power ARM system processor is thus able to act as the master processor—on top of the performance PC processor of the basic x86 architecture—of the electronic device.

However, by placing the ARM processor on the high-speed buses (PCI-e) of the North Bridge the same way as the display controller and the memory subsystems of the x86 architecture, the Cupps et al. device has limited "master control" over the entire device. In fact, rather than the supreme master processor of the entire electronic device, the bus connection of the ARM processor in the device categorizes itself as a bus master device under the standard x86 architecture. With this system architecture, because the main x86 architecture under the PC processor must maintain a complete and sound power management status under, for example, ACPI, any slightest disruption to breach the integrity of this status results in the lost of data and the need for a complete reboot. Most frequently, the ARM processor in the Cupps et al. device will be rebooting the PC processor-based main x86 system for whichever heavier tasks that call for the processing power of the PC processor.

There is therefore the need for a bridge logic device for a heterogeneous computer system that implements best minimization of the computing power consumption without sacrificing the computing capability to make a green x86 computer.

There is also the need for a bridge logic device for a heterogeneous computer system that implements best minimization of the computing power consumption to make a practical x86-based smart mobile device by sustaining at least one workday on battery per battery charging.

There is also the need for a bridge logic device for a heterogeneous computer system that makes a non-x86 smart mobile device capable of access to the x86 software base.

There is also the need for a bridge logic device for a heterogeneous computer system a cross-OS heterogeneous computer system that provides simultaneous, integrated and seamless access to software applications of different OS's.

SUMMARY

The present invention achieves the above and other objects by providing a heterogeneous computer system comprising an x86 core having an x86 processor and an x86 computing architecture; a hypervisor processor having a performance capability lower than the x86 processor; and a bridge logic connecting the hypervisor processor to the x86 core via the local bus of the x86 processor; wherein the hypervisor processor executing software tasks it has sufficient performance to handle and putting the x86 processor to idle (sleep, hibernation, shutdown); and the hypervisor processor bringing up the x86 processor to execute software tasks its has insufficient performance to handle.

The present invention further achieves the above and other objects in certain embodiments by providing a bridge logic device for a heterogeneous computer system that has at least one performance processor, a processor supporting logic supporting the at least one performance processor to execute tasks of the software, and a hypervisor processor consuming less power than the at least one performance processor. The bridge logic device comprises a hypervisor operation logic hat maintains status of the system under the at least one performance processor; a processor language translator logic that translates between processor languages of the at least one performance and the hypervisor processors; and a high-speed bus switch that has first, second and third ports for relaying data across any two of the three ports bidirectionally. The switch is connected to the at least one performance processor at the first port, to the hypervisor processor via the processor language translator logic at the second port and to the processor supporting logic at the third port.

In a bridge logic device of certain embodiments of the present invention that achieves the above and other objects the hypervisor processor, supported by the processor supporting logic and with the high-speed bus switch connecting across the second and third ports, executes tasks of the software that the hypervisor processor has sufficient processing power to handle by using native language translated by the processor language translator logic and puts the at least one performance processor to a power-conserving state.

In a bridge logic device of certain embodiments of the present invention that achieves the above and other objects the hypervisor processor, using the maintained system status and with the high-speed bus switch connecting across the first and third ports, brings up the at least one performance processor out of the power-conserving state to execute tasks of the software that the hypervisor processor has insufficient processing power to handle.

In another bridge logic device of certain embodiments of the present invention that achieves the above and other objects the at least one performance and hypervisor processors, with the high-speed bus switch connecting across the first, second and third ports correspondingly, simultaneously execute tasks of the software that require combined processing power of all processors.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figure 2:
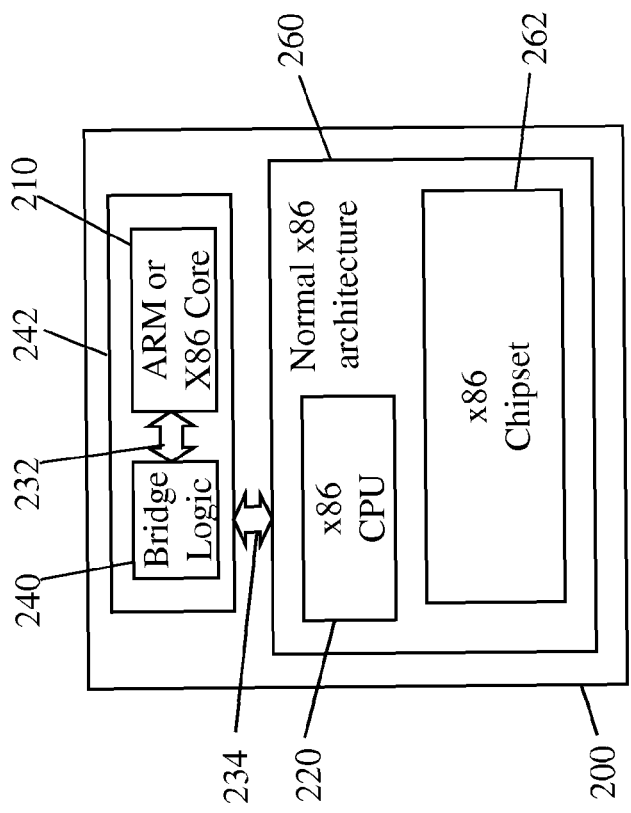
FIG. 2 schematically outlines the block diagram of another implementation of the heterogeneous computer system of the present invention that has a hypervisor processor core and its necessary bridge logic built on the same semiconductor chip for addition to standard x86 architecture.

The following example embodiments are provided to illustrate but not to limit the present invention.

The inventive computer system of the present invention is based on a hetero-processor system that delivers green computing—deep green computing. A low-power mastering "hypervisor" processor is added to the mainstream standard x86 architecture via a bridging logic circuitry to make a heterogeneous computer system that's both powerful and energy conserving for green performance computing.

The inventive heterogeneous computer system achieves to reduce as much possible power consumption in x86 computing so that (1) The entire x86-dominated mainstream computing can contribute carbon reduction of significance; and (2) The vast x86 software base can become truly practically accessible to mobile users for our mobile needs. The inventive heterogeneous computer system also achieves cross-OS computing to allow for simultaneous, integrated and seamless access to software applications from different OS's.

In other words, the heterogeneous computer system of the present invention seeks to address these issues and achieve at least two main goals. First, the inventive computer system provides a solution to a portable smart device, a new breed of smart phone to be specific, that has access to the vast existing x86 application software base while is also sufficiently power-conserving so as to sustain at least one full workday on battery. Such one mobile device will replace the cumbersome smart phone and laptop pair for many business travelers.

Secondly, and more importantly, the inventive computer system can realize deep green computing in mainstream computers including desktop, workstation and server computers. The idea is that any power conservation contributed by each computer out there adds up to a huge global reduction in computer power consumption.

Meanwhile, while fulfilling these objectives, the heterogeneous computer system of the present invention also achieves to allow the simultaneous, integrated and seamless access to software applications of different OS's using the same hardware.

Note that the term "x86 applications" in this invention refers to the broader sense of all x86 software applications that can be executed under various OS available to the x86 hardware architecture. Thus the term means all software applications written for OS's such as Windows, Linux, Mac OS, Solaris etc., all those currently supported by the x86 architecture.

Also, "hypervisor" in computing normally means virtual machine monitor—VMM, more of a software technique than hardware. However, the terms is also used herein to refer to the master processor, the low-power ARM, in the asymmetric hetero-processor system of this invention that supervises the x86 processor, the performance but power-consuming element of the system that is essentially the slave processor under the master ARM. This terminology is selected also because the master processor does in fact monitor and control the virtual machines necessarily embedded in the software system of the present invention.

It is so named because the ARM master processor is conceptually one level higher than the x86 processor that supervises the x86 hardware, the main hardware of a heterogeneous computer system of the present invention—meaning that the master ARM "hypervises" its slave x86, which supervises the main x86 hardware.

Also, the term performance processor is used to mean the main x86 processor in the standard x86 architecture. It is thus named to reflect the fact that the x86 processor in the inventive heterogeneous computer system is responsible for the serious number crunching jobs.

To find a solution for computers to minimize power consumption without sacrificing computing power is of course a known technical issue with known practices. In mobile computing (laptop, touch-screen computers and smart phones, etc.), power management must be addressed brilliantly to sustain operation for as long as possible—with a life of at least one work day out on the road. In mainstream desktop computing, power management is important because of the huge global installation base—a global environmental issue comparable to MPG performance in passenger cars.

But the conventional power management would not be able to reach the goal of having an x86 architecture work sufficiently power-conserving for practical road applications. This is the limitation of the present-day x86, it is simply not designed so.

The solution lies in the hetero-processor concept. For such a heterogeneous computer system to be commercially successful, the computer system must be compatible to the existing industry standards to a degree as high as possible. It is simply impractical to think of changing the Wintel with so huge a momentum. The heterogeneous computer system solution must fit the existing, not the other way around. And this means the adjustment must be as slight as possible both in hardware and software.

A: Heterogeneous Computer System with a Bridge Logic

From the perspective of system hardware architecture, a heterogeneous computer system of the present invention has a "hypervising" processor that resides on the local (front side) bus of the standard x86 architecture. See FIGS. 1-4. This is fundamentally different from the Cupps et al. electronic device described above which connects its system processor to the North bridge of the x86 architecture via the system bus.

Figure 1:
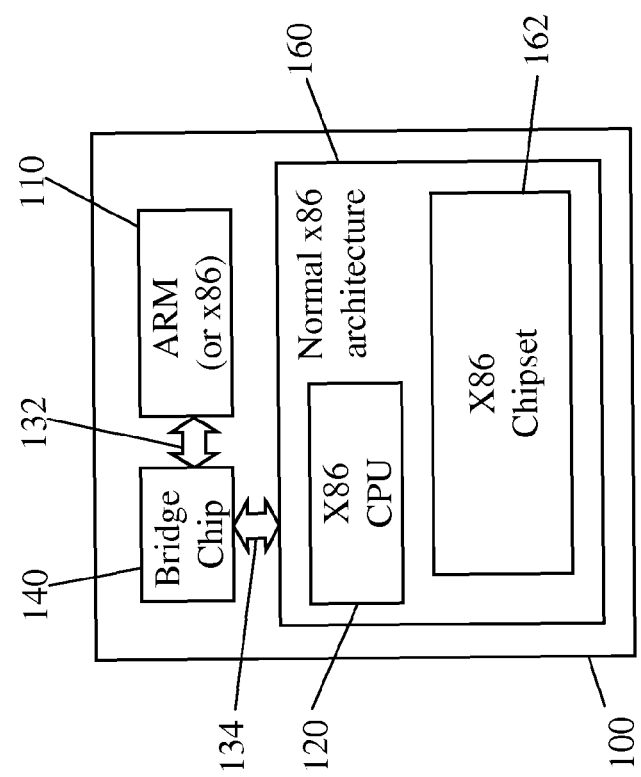
FIG. 1 schematically outlines the block diagram of an implementation of the heterogeneous computer system of the present invention that has a hypervisor processor added to standard x86 architecture via a bridge circuit chip.

FIG. 1 schematically outlines the block diagram of an implementation of the heterogeneous computer system of the present invention that has a hypervisor processor added to standard x86 architecture via a bridge circuit chip. In a preferred embodiment of the present invention the heterogeneous computer system 100 has a standard x86 architecture 160, which, by itself, constitutes a complete x86 computer with its x86 CPU 120 and the supporting x86 chipset 162.

The hypervisor processor 110 is added to the standard x86 architecture 160 via a bridge chip 140 that contains the digital electronic circuitry for the hypervisor processor 110, an ARM, or a low-power x86 processor (such as 386 or even 286), to be inserted into the x86 architecture 160 via the front-side bus (FSB) 134 of the x86 CPU.

Figure 7:
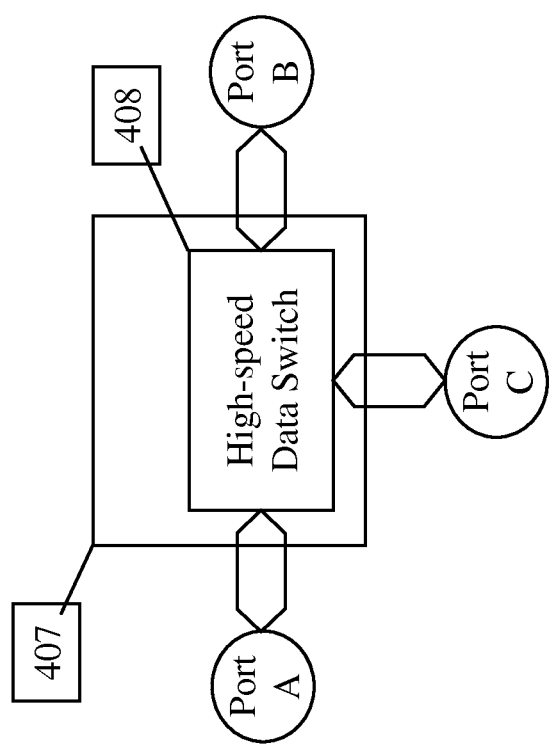
FIG. 7 schematically illustrates the concept of the bridge logic used for the construction of the heterogeneous computer system of the present invention.

FIG. 7 schematically illustrates this concept of the bridge used for the construction of the heterogeneous computer system of the present invention. "Bridge Logic" means it is a bridging device (logic) that allows, for example in the system of FIG. 1, the connection (attachment) of the hypervising ARM processor 110 to an existing x86-based computer system 160. Within the context of the present invention, such a bridge device 407 as outlined in FIG. 7 functions as a three-way data switch 408. In other words, data switch 408 here refers to a multiple-way switch, a 3-way T or Y switching device that allows data passage from either of the three to any one of the remaining two. Details of how this bridge logic works to insert the hypervisor processor into an x86 architecture will be described below.

FIG. 2 schematically outlines the block diagram of another implementation of the heterogeneous computer system of the present invention that has a hypervisor processor core and its necessary bridge logic built on the same semiconductor chip for addition to standard x86 architecture. In this embodiment of the present invention the heterogeneous computer system 200 has a standard x86 architecture 260, which, by itself, constitutes a complete x86 computer with its x86 CPU 220 and the supporting x86 chipset 262.

The hypervisor processor 210 in the form of an ARM or an x86 core is added to the standard x86 architecture 260 via a bridge logic 240 that contains the digital electronic circuitry for the hypervisor processor 210 to be inserted into the x86 architecture 260 via the front-side bus (FSB) 234 of the x86 CPU. In this example, the hypervisor processor 210 and the necessary bridge logic 240 are made on the same integrated chip, the hypervisor chip 242.

Figure 3:
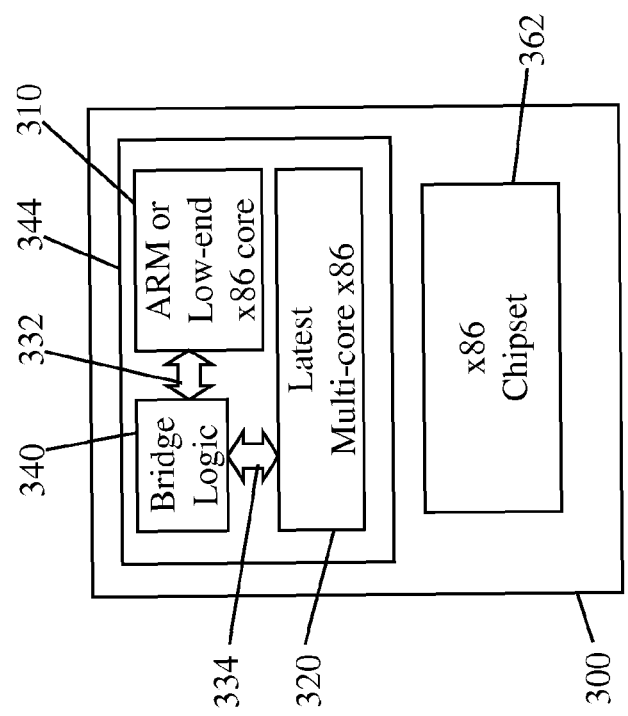
FIG. 3 schematically outlines the block diagram of another implementation of the heterogeneous computer system of the present invention that has a hypervisor processor core and its necessary bridge logic built on the same semiconductor of a multi-core x86 processor for direct drop-in in the CPU socket of a standard x86 computer board.

FIG. 3 schematically outlines the block diagram of yet another implementation of the heterogeneous computer system of the present invention. It has a hypervisor processor core and its necessary bridge logic built on the same semiconductor of a multi-core x86 processor for direct drop-in in the CPU socket of a standard x86 computer board.

In this embodiment the heterogeneous computer system 300 is itself a standard x86 architecture, which, by itself, constitutes a complete x86 computer with its x86 CPU 344 and the supporting x86 chipset 362. The x86 CPU 344 is a variant to its conventional counterpart. It consists essentially on the same semiconductor die of an x86 performance processor, for example the latest multi-core x86 320, a hypervising ARM or low-end x86 core 310, and the bridge logic 340 to bridge the hypervisor to the performance core via the front-side bus 334.

Figure 4:
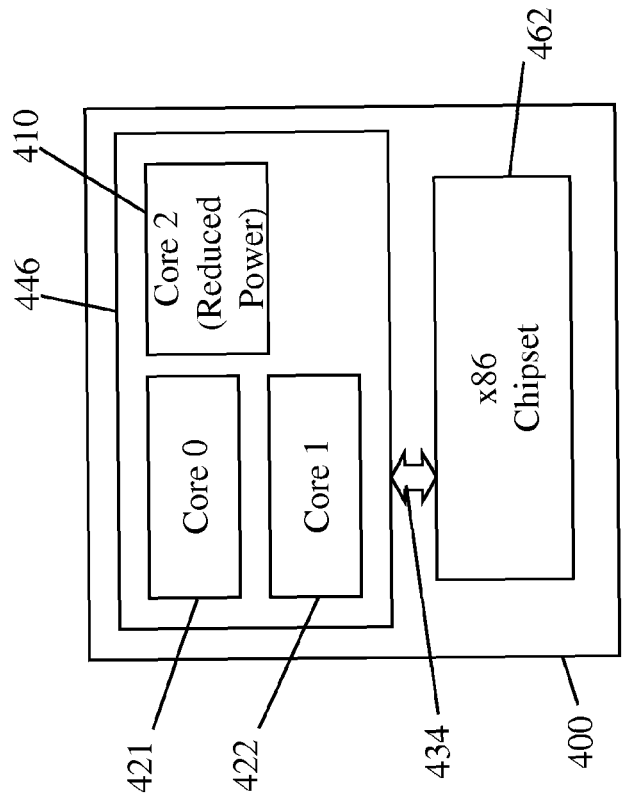
FIG. 4 schematically outlines the block diagram of another implementation of the heterogeneous computer system of the present invention that has a reduced-power x86 core serving as the hypervisor processor on the same semiconductor of a multi-core x86 processor for direct drop-in in the CPU socket of a standard x86 computer board.

FIG. 4 schematically outlines the block diagram of another implementation of the heterogeneous computer system of the present invention that has a reduced-power x86 core serving as the hypervisor processor on the same semiconductor of a multi-core x86 processor for direct drop-in in the CPU socket of a standard x86 computer board.

In this embodiment the heterogeneous computer system 400 is itself a standard x86 architecture that constitutes a complete x86 computer with its x86 CPU 446 and the supporting x86 chipset 462. The x86 CPU 446 is another variant to the conventional counterpart. It consists essentially on the same semiconductor die of x86 performance processor cores 421 and 422, and a hypervising reduced-power x86 core 410. No bridge logic is necessary as the hypervisor core 410 implements a reduced instruction set of the performance cores 421 and 422 and shares the same internal bus. The hypervisor-equipped performance processor 446 is connected to the x86 chipset 462 in the same manner as standard x86 computer boards via the normal FSB 434.

Literally, as shown in FIGS. 1-4, the concept of constructing a heterogeneous computer system of the present invention is to add a power-sipping master, most likely an ARM at present, to an x86 computer. The idea is to have the low-power hypervisor processor awake all the time to hypervise the power-hungry workhorse x86. Under this concept, the x86 is a pure slave under the ARM hypervisor processor and can be put to deep rest to conserve energy and only called into action when the relatively low-performance can not, or is insufficient to, handle the task assigned to the system.

Depending on the main purpose of use of an inventive heterogeneous computer system, its x86 system can be the latest Intel $2^{nd}$ generation Core™ technology processor-based performance system for, CAD/CAM workstations, for example. Or, the selected x86 can be an Atom™-based low-power system for a mobile device that is intended to replace the smart phone-laptop pair for frequent business travelers.

Using existing x86 architectures, such heterogeneous computer system hardware can be constructed with ease. For commercial applications, the following solutions in FIGS. 1-4 are suitable for different computer hardware manufacturers along the computer industry supply chain.

The computer system architectures of FIGS. 1 and 2 constitute business to current computer motherboard and system makers. They can procure the ARM processor and the bridge chip to manufacture their products. The architecture of FIG. 3, however, is dependent on whether or not any of the current x86 and compatible processor makers adopts this technology and make adjustments to their processor semiconductor to produce their versions of the heterogeneous computer system concept CPUs.

This is possible from the business perspective. For any of the current CPU makers, this concept involves relatively little semiconductor changes to their existing multi-core products but with so large potential impacts on the performance of computers made out of these new concept CPUs—green computing. FIG. 4 illustrates a vision of such an architecture that is most suitable for mainstream desktop/workstation computing.

Figure 6:
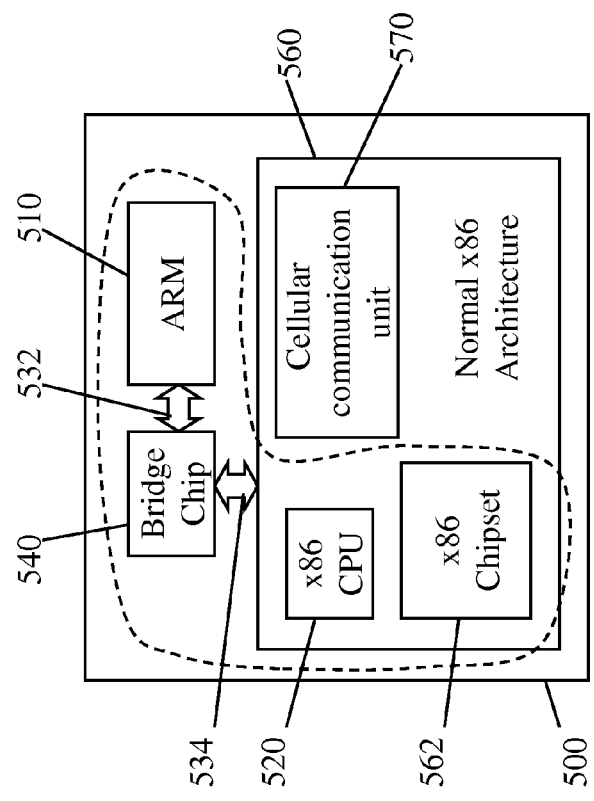
FIGS. 5 and 6 schematically outline the block diagram of another embodiment of the computer system of the present invention as an x86-based smart mobile device.
Figure 5:
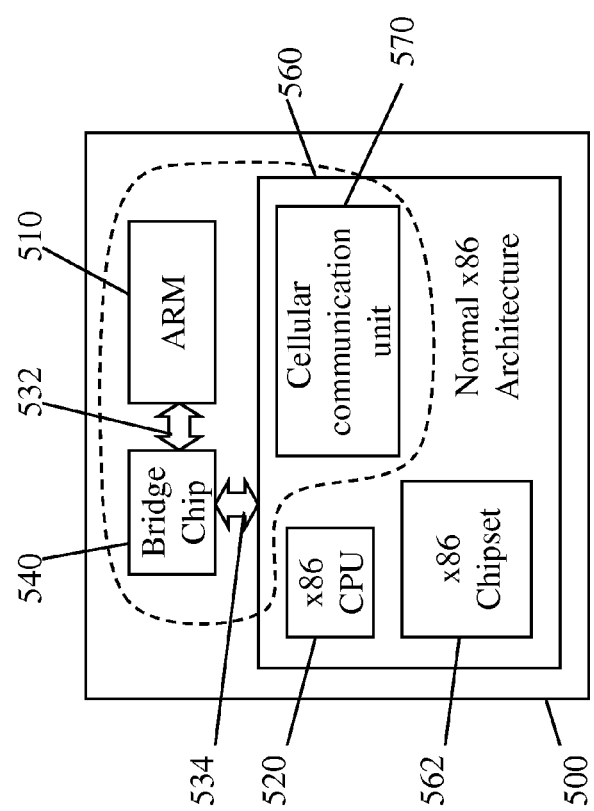

FIGS. 5 and 6 schematically outline the block diagram of another embodiment of the computer system of the present invention as an x86-based smart mobile device. Such an x86 smart device has the functionalities of both a cell phone and an x86-based computer and can be used to replace the indispensable pair of mobile phone and laptop computer for business travelers.

In this example, similar as in the example of FIG. 1, the smart phone-plus-laptop version of the heterogeneous computer system 500 has an x86 architecture 560, which, by itself, constitutes a complete x86 computer with its x86 CPU 520 and the supporting x86 chipset 562. To provide the cell phone functionality, a cellular communications unit 570 can be implemented as part of the x86 architecture.

The hypervisor processor 510 is connected to the x86 architecture 560 via a bridge chip 540 that contains the digital electronic circuitry for the hypervisor processor 510, an ARM, to be inserted into the x86 architecture 560 via the front-side bus (FSB) 534 of the x86 CPU.

As is outlined by the enclosing phantom-line in FIG. 5, when the x86 smart mobile device 500 works its cell phone functionality, the entire x86 core 560 including the x86 CPU 520 and the main x86 chipset 562 can be put to rest, with the exception of the cellular communications unit 570, which is operated under the hypervising ARM processor 510.

On the other hand, when the device 500 operates its portable computer to run, for example, Windows applications as illustrated in FIG. 6, all components of the device 500 except the cellular communications unit 570 is activated. For example, a net banking application can be executed by the x86 system under the supervision of ARM. The low-power ARM provides hypervision all the time to determine when the x86 section of the device can be put to rest for the conservation of the battery energy.

In order to implement green computing so that the desktop implementation of the inventive heterogeneous computer system described in FIGS. 1-4 can conserve energy, so that the x86 smart mobile device such as described in FIGS. 5 and 6 can sip its battery energy in order to sustain an entire workday out on the road, and so that both can have simultaneous, integrated and seamless mix-OS software applications, the hardware described needs to have a corresponding system software to implement all that described. Such a software system will be described in detail below.

B: Bridge Logic for the Heterogeneous Computer System

Figure 8:
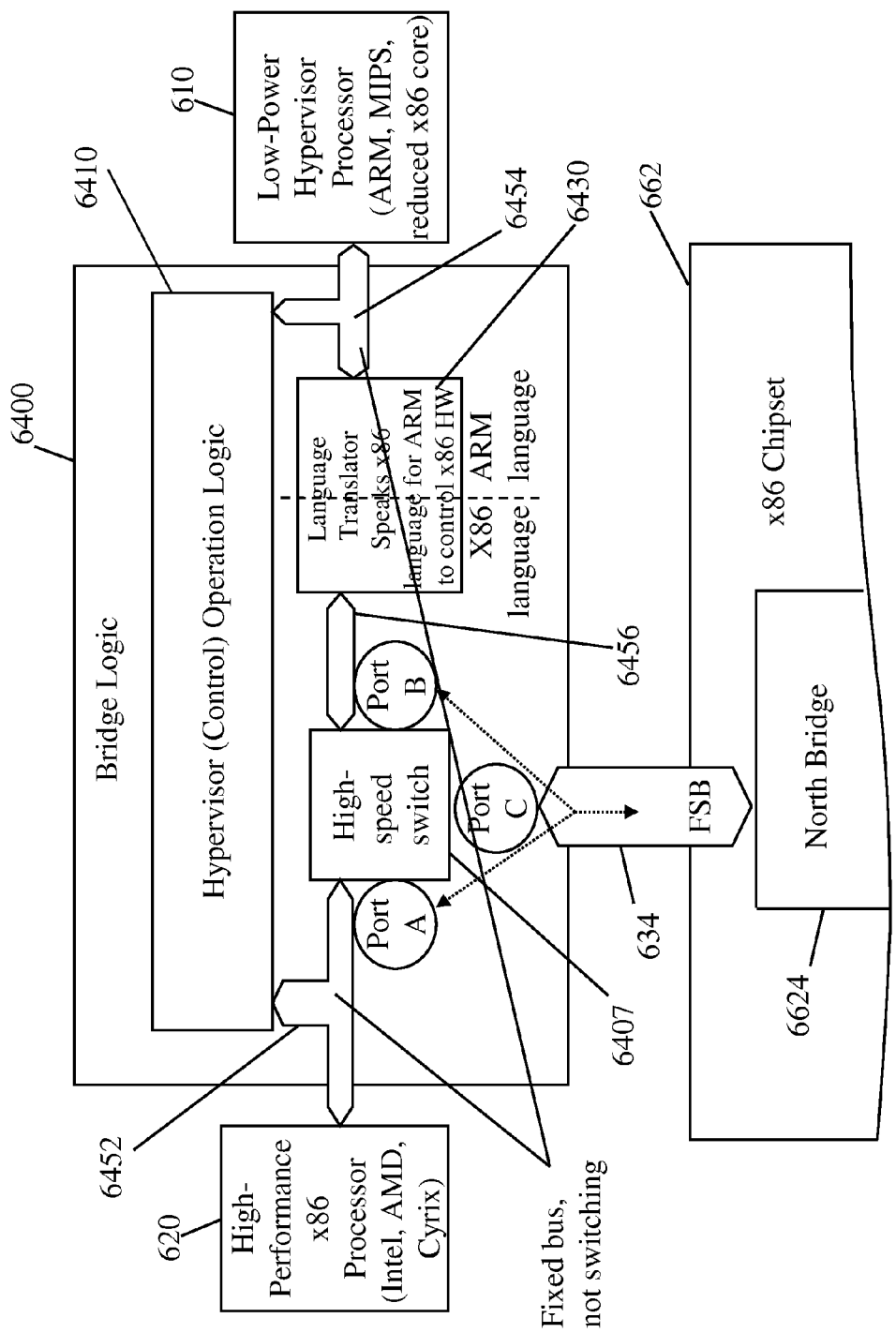
FIG. 8 schematically illustrates the connection by the bridge logic of the hypervisor processor and the main processor of the x86 architecture onto the front-side bus of the x86 chipset in the inventive heterogeneous computer system.

FIG. 8 schematically illustrates the connection—by the bridge logic 6400—of the hypervisor processor 610 and the main x86 processor 620 onto the front-side bus of the x86 chipset 662 in the inventive heterogeneous computer system. Underlying concept of the heterogeneous computer system of the present invention is the introduction of a supervising microprocessor—the hypervisor processor—to a powerful computer that already has its own capable microprocessor—the x86 processor. The concept is to have the hypervisor processor consume as little power as possible to stay active all the time when the heterogeneous computer system is powered up and manages the computational works of the performance x86 subsystem of the inventive apparatus. In such a heterogeneous computer system, the performance x86 subsystem is only brought out of rest to work whenever the hypervisor processor determines that an assigned computing task is beyond the capacity of the low-power hypervisor processor.

To do so, as described in the embodiments of FIGS. 1-4 and as is illustrated in more detail in FIG. 8, the bridge logic circuit 6400 sits between the x86 performance processor 620 and the x86 chipset 662 of the standard x86 computer on the front-side bus. Literally the direct connection of an x86 processor to the North Bridge of the x86 chipset via the front-side bus in a normal x86 computer is interrupted by the introduction of the bridge logic 6400. The original FSB connection between the x86 processor 620 and the North Bridge 6624 is still in place but broken down into two sections—FSB 6452 at the x86 processor side and FSB 634 at the chipset side—under control of the bridge logic 6400. Meanwhile, the bridge logic 6400 sits similarly between the added hypervisor processor 610 and the FSB 634 connected to the North Bridge 6624 of the x86 chipset 662.

The bridge logic 6400 includes a hypervisor operation logic 6410, a processor instruction set/computer command translator logic or, grossly, the processor language translator logic, 6430, and a high-speed bus switch 6407. The bus switch 6407 has a switching rate compatible to the x86 processor FSB. As described in FIG. 7, this bus switch 6407 is, preferably, a three-way switch, of which one port (A in the illustration) is directly connected to the FSB 6452 of the x86 processor 620. A second port (B) of the switch 6407 is connected to the processor bus 6454 of the hypervisor processor 610 via the processor language translator logic 6430. The third port (C) of switch 6407 is connected directly to the FSB 634 of the North Bridge of the chipset 662.

Such a connection by the high-speed bus switch 6407 allows both the x86 performance processor 620 and the low-power hypervisor processor 610 to have access to the North Bridge 6624 of the x86 architecture via FSB 634. Whenever the switch 6407 is set to connect its ports A and C, the performance x86 processor 620 can have direct connection to the North Bridge much like in a normal x86 computer.

On the other hand, when the switch 6407 is set to connect its ports B and C, the low-power hypervisor processor 610 can have access to the x86 chipset 662. In case that the hypervisor processor 610 is another low-power x86 processor that operates the same—or a subset of—x86 processor instruction set as the performance x86, the processor language translator logic 6430 needs only provide a simple conversion between different levels of x86 instruction sets.

However, if the low-power hypervisor processor 610 is one that operates an entirely different instruction set—such as in the case of an ARM or a MIPS, the hypervisor processor 610 needs to mimic, or emulate, the performance x86 processor using the processor language translator logic 6430. In this case, the translator logic 6430 translates, or converts, the hypervisor processor 610 native commands into the equivalent command of the performance x86 processor 620 using the native instructions of the performance processor 620.

Essentially, the language translator logic 6430 translates between x86 and hypervisor (ARM for example) processor languages (instructions) so that the hypervisor 610 understands and fully monitors x86 activities in the computer system and that x86 processor 620 may take orders from hypervisor 610. The translator logic 6430 also synchronizes exchanges of data between the high-speed x86 FSB 634 and the typically lower bus speed of the low-power hypervisor processor 610, for example, the AMBA (Advanced Microcontroller Bus Architecture) bus normally adopted by ARM devices.

Figure 9:
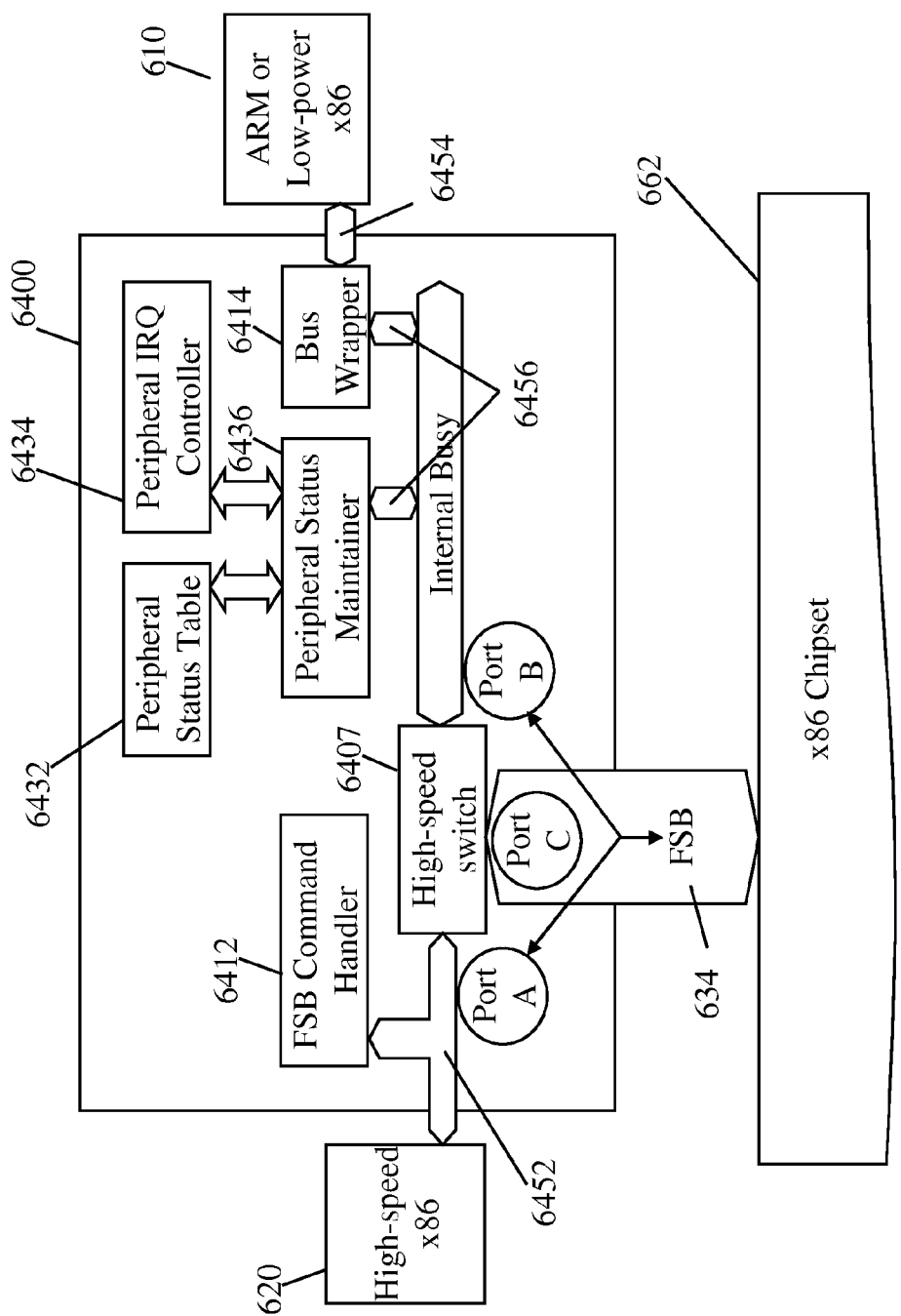
FIG. 9 schematically outlines the basic functional elements in the bridge logic in accordance with a preferred embodiment of the present invention.
Figure 10:
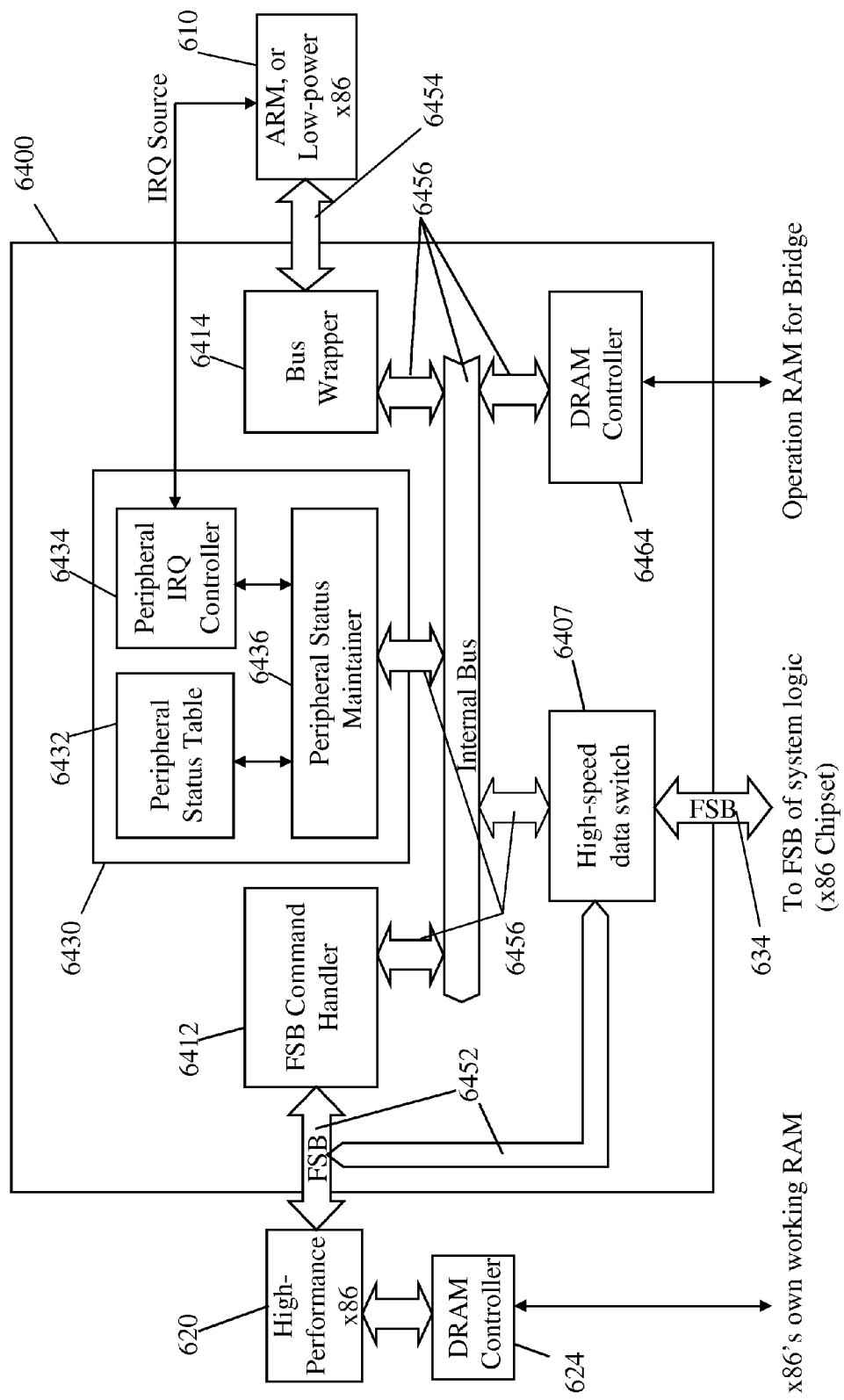
FIG. 10 schematically illustrates the logic circuit elements of the bridge logic of FIG. 9 in more detail.

In other words, to facilitate the normally lower-performance hypervisor processor's access to the high-performance x86 architecture, the bridge logic 6400 must be equipped to do the translation of (1) the processor "language" and (2) bus communication electrical signal. Bus wrapper 6414 such as found in the examples of FIGS. 9 and 10 is responsible for this bus protocol conversion and implements conversion between data bus width, address bus lengths, and bus signal electrical levels, timing etc.

In a preferred embodiment as described in FIG. 8, all such conversion can be implemented together with the hypervisor operation logic 6410, which monitors the entire x86 activities under x86 processor to maintain an off-x86 copy of system status so that the x86 processor can pick-up operation seamlessly after being awaken. Hypervisor operation logic 6410 may also be able to translate ARM commands into x86 when the x86 processor 620 is put to rest and ARM runs x86 code through technologies such as virtual machine and on-the-fly command/instruction translation.

Note that the bridge logic 6400 can either be a passive digital logic run by the low-power hypervisor processor (ARM) or it may itself be a microprocessor-based active logic. Also, the performance x86 processor can be an Intel, an AMD, or a Cyrix processor and the low-power hypervisor processor can be an ARM, a MIPS or a reduced x86 core.

In all, bridge logic components switch 6407, logic 6410 and logic 6430 work together to provide a bridging function so that the x86 processor 620 has direct access to the x86 architecture 662 under control of the hypervisor processor 610 for the implementation of performance tasks assigned to the heterogeneous computer system. And, on the other hand, the hypervisor processor 610 may have indirect access to the x86 architecture 662 when the x86 processor 620 is not needed.

Also note that the term "instruction set" as in the "microprocessor instruction set" of either the hypervisor or the performance processor of the inventive heterogeneous computer system described herein means the part of the computer architecture that is related to programming and includes the native data types, instructions, registers, addressing modes, memory architecture, interrupt and exception handling, and external I/O. Further, the term "commands" as in "computer commands" of either the hypervisor or the performance processor of the inventive heterogeneous computer system described herein means the artificial language that expresses computations that can be performed by a computer system.

FIG. 9 schematically outlines the basic functional elements in the bridge logic in accordance with a preferred embodiment of the present invention. Functionality of the processor instruction set translator logic 6430 in the bridge logic 6400 is provided by the peripheral status maintainer 6436, the peripheral status table 6432, and the peripheral IRQ controller 6434. This keeps a constant record of the status of the peripherals attached to the heterogeneous computer system.

Meanwhile, functionality of the hypervisor operation logic 6410 of the bridge logic 6400 is provided by the FSB command handler 6412 and the bus wrapper 6414. Essentially the FSB command handler 6412 monitors the computer commands performed by the performance processor 620 so that the set of peripheral status can be maintained as described above to keep track of the peripherals in the heterogeneous computer system (normally attached to the South Bridge of the x86 chipset 662) so that when the performance x86 is put to rest, it can pick up the right status after awaken.

On the other hand, when the performance x86 processor 620 is at rest, and the hypervisor processor 610 relies on the FSB command handler 6412 and the bus wrapper 6414 to translate its commands into x86 so that the x86 chipset can be accessed. Essentially the bus wrapper 6414 plays the role of a translating speaker for the non-x86 hypervisor processor 610 to "speak" the native x86 command language. This allows for the hypervisor processor 610 to have direct access to the x86 architecture resources regardless of either the performance processor 620 is at rest.

Figure 11:
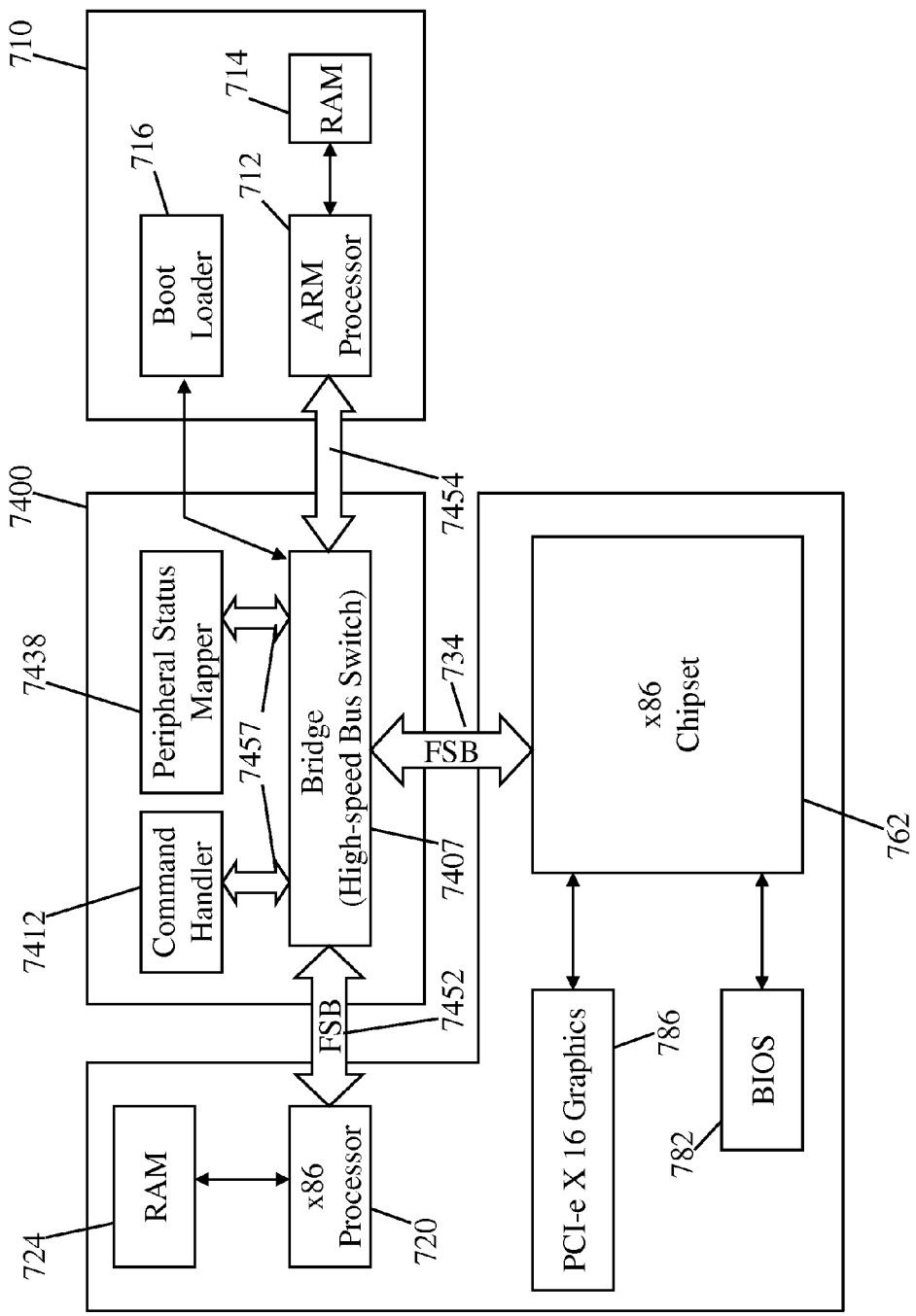
FIG. 11 schematically illustrates the circuit block diagram of the inventive heterogeneous computer system in accordance with a preferred embodiment of the present invention.

FIG. 11 schematically illustrates the circuit block diagram of the inventive heterogeneous computer system in accordance with a preferred embodiment of the present invention. In this example the bridge logic 7400 has a slightly different logic circuit arrangement. The bus switch 7407 is a four-way switch that still provides both the hypervisor 710 and the performance x86 processor's direct access to the x86 architecture. However, the command handler 7412 for the command translator logic and the peripheral status mapper 7438 for the hypervisor operation logic are on the fourth port of the bus switch 7407. In this example, the command handler 7412 is responsible for the following tasks:

1, command queuing and command parsing.
2, translation of x86 commands into corresponding ARM commands.
3, translation of ARM commands into correspond x86 commands.
4, x86 status maintenance.
5, Direct or indirect access to peripherals.

The peripheral status mapper 7438 is responsible for the following tasks:

1, Peripheral mapping for the ARM processor.
2, Maintenance of peripheral status.

The bus switch 7407 has the following tasks:

1, bridges between the high-speed FSB (of Intel, AMD, Via-Cyrix performance processors) and the lower-speed AMBA bus (of ARM).

2, bridging for x86 direct or indirect access to the x86 architecture.

Also, the performance x86 processor may have its own working RAM 724, and the hypervisor processor 710 is an embedded processor 712, which may also have its own working RAM 714 and an on-board boot loader 716.

Figure 12:
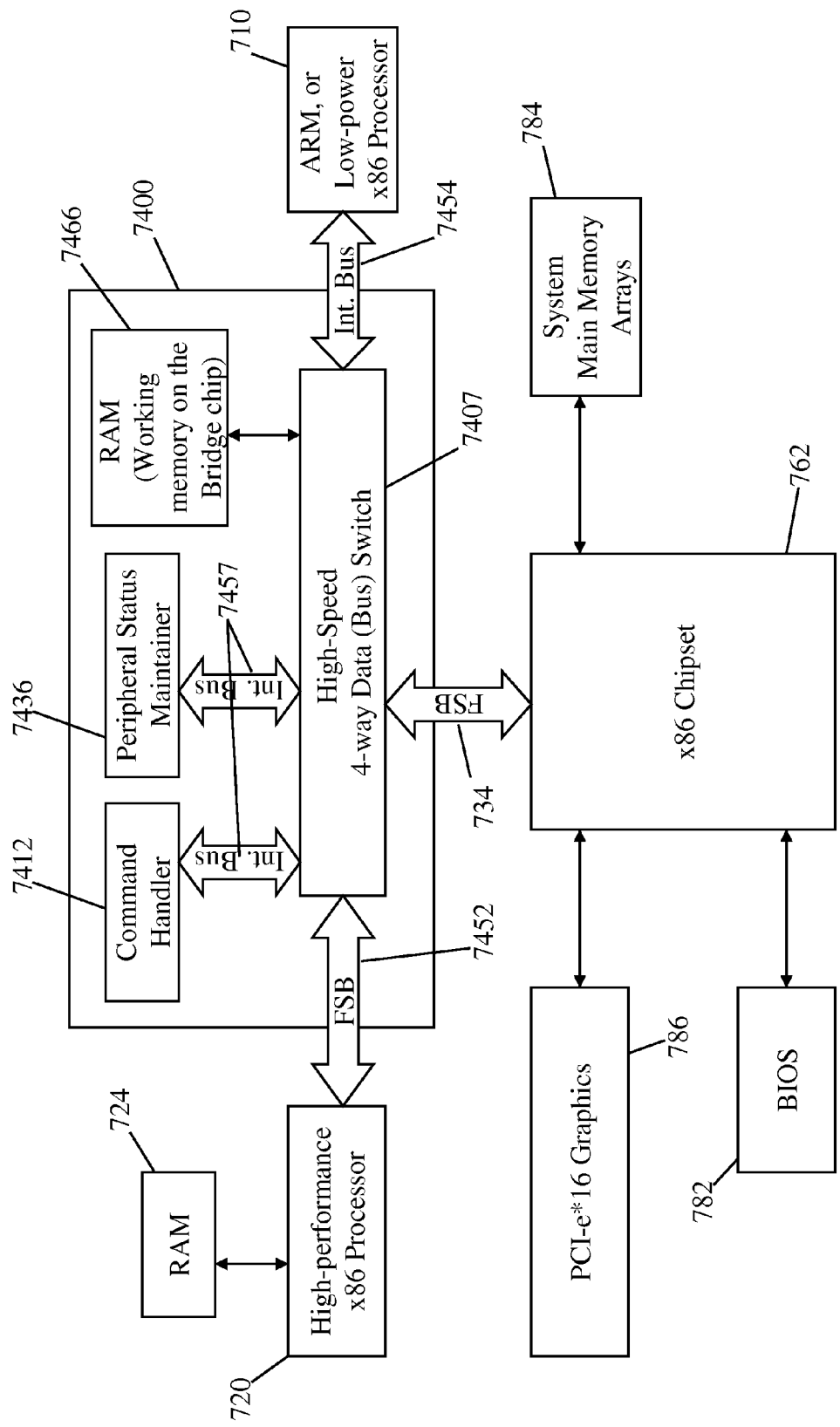
FIG. 12 schematically illustrates the logic circuit elements in the bridge logic in accordance with a preferred embodiment of the present invention.

FIG. 12 schematically illustrates the logic circuit elements in the bridge logic in accordance with a preferred embodiment of the present invention. The bridge logic 7400 is illustrated to be in cooperation with the x86 chipset and the two processors of the system. Bridge logic 7400 includes the same command handler 7412 as in FIG. 11, which serves to translate the x86 codes into that of the low-power ARM hypervisor's and vice versa. The command handler 7412 can either be a dumb logic under ARM control or it can also be a processor-based command handler.

The peripheral status maintainer 7436 of the implementation of FIG. 12 is slightly different from the peripheral status mapper 7438 of FIG. 11. With its own memory and/or registers, the PSM 7436 is a synchronizer that allows for the ARM hypervisor to have full grasp of exact status of the x86 main system. The status maintenance is so that (1) ARM can pick up x86's task (via, for example, the virtual computing technology) anytime with the correct system status, and (2) the x86 processor can pick up ARM's task (when, for example, ARM is under-powered for certain tasks) when brought back from rest (standby/sleep/hibernation) with the right status. Again, the PSM 7436 can either be a dumb logic operating under ARM control or it can also be a processor-based maintainer.

FIG. 10 schematically illustrates another example of the logic circuit elements of the bridge logic of FIG. 9 in more detail.

Figure 13:
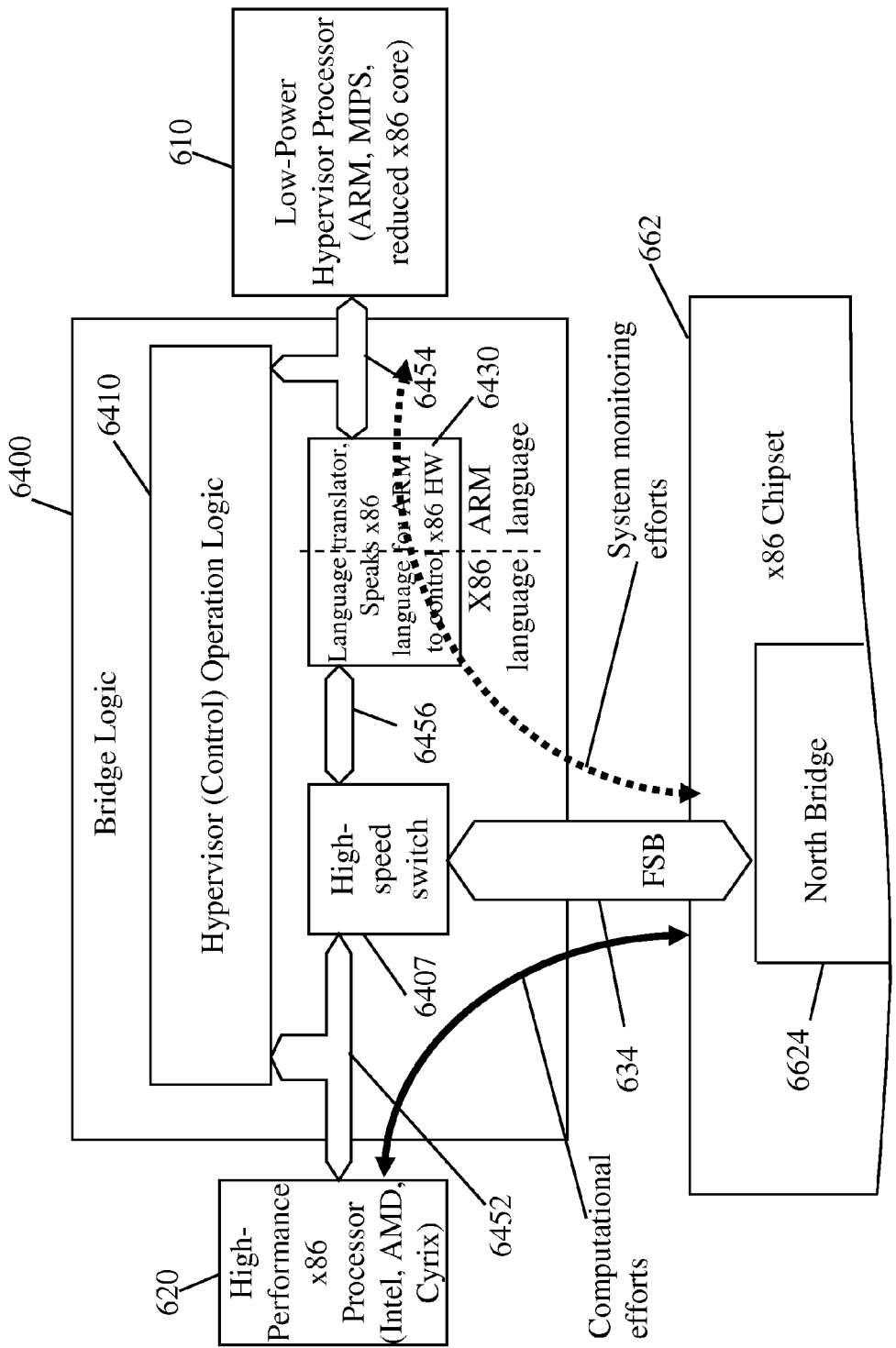
FIGS. 13-15 respectively illustrate the operating modes of the inventive heterogeneous computer system described in FIGS. 8-12.
Figure 14:
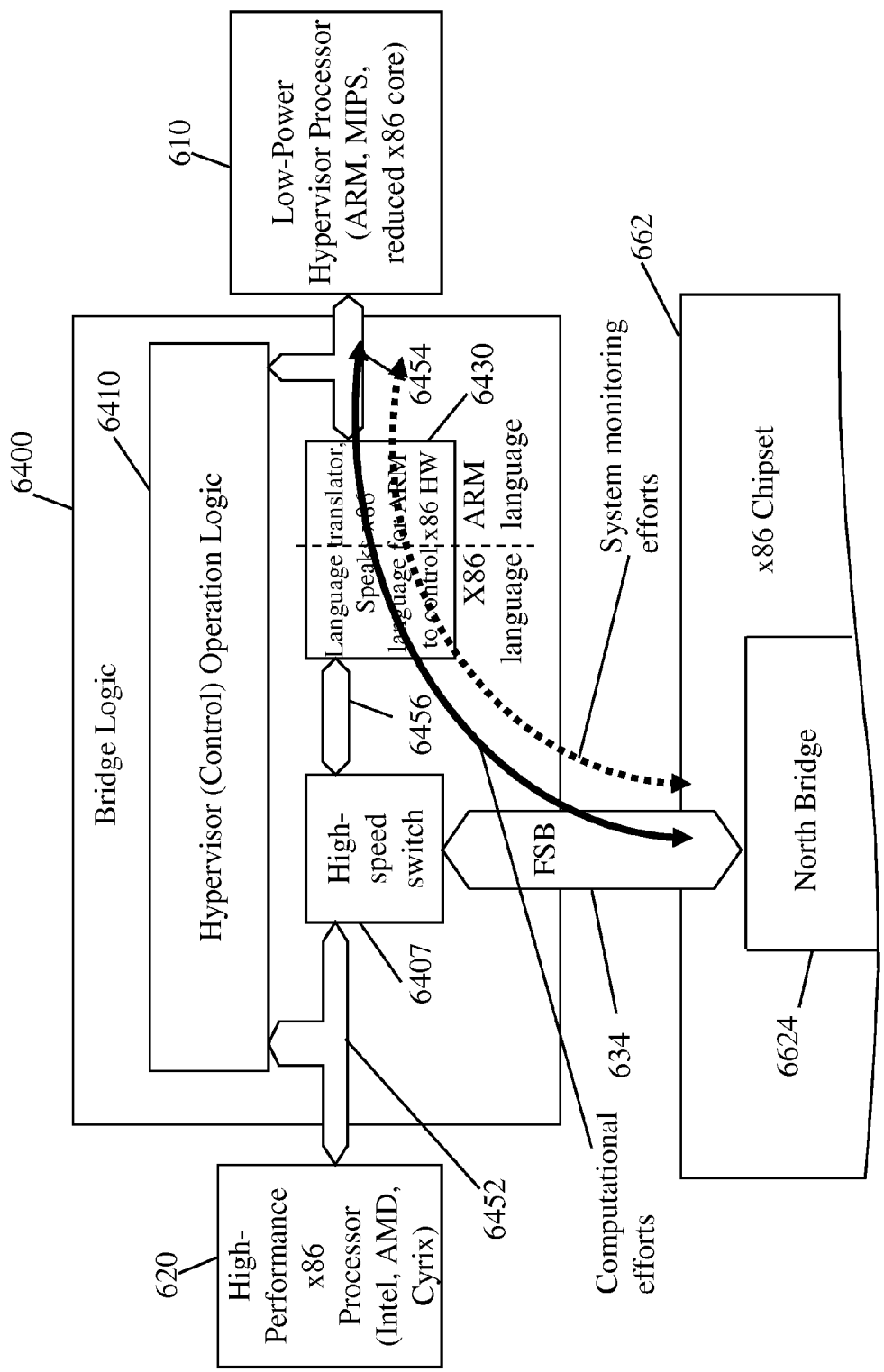
Figure 15:
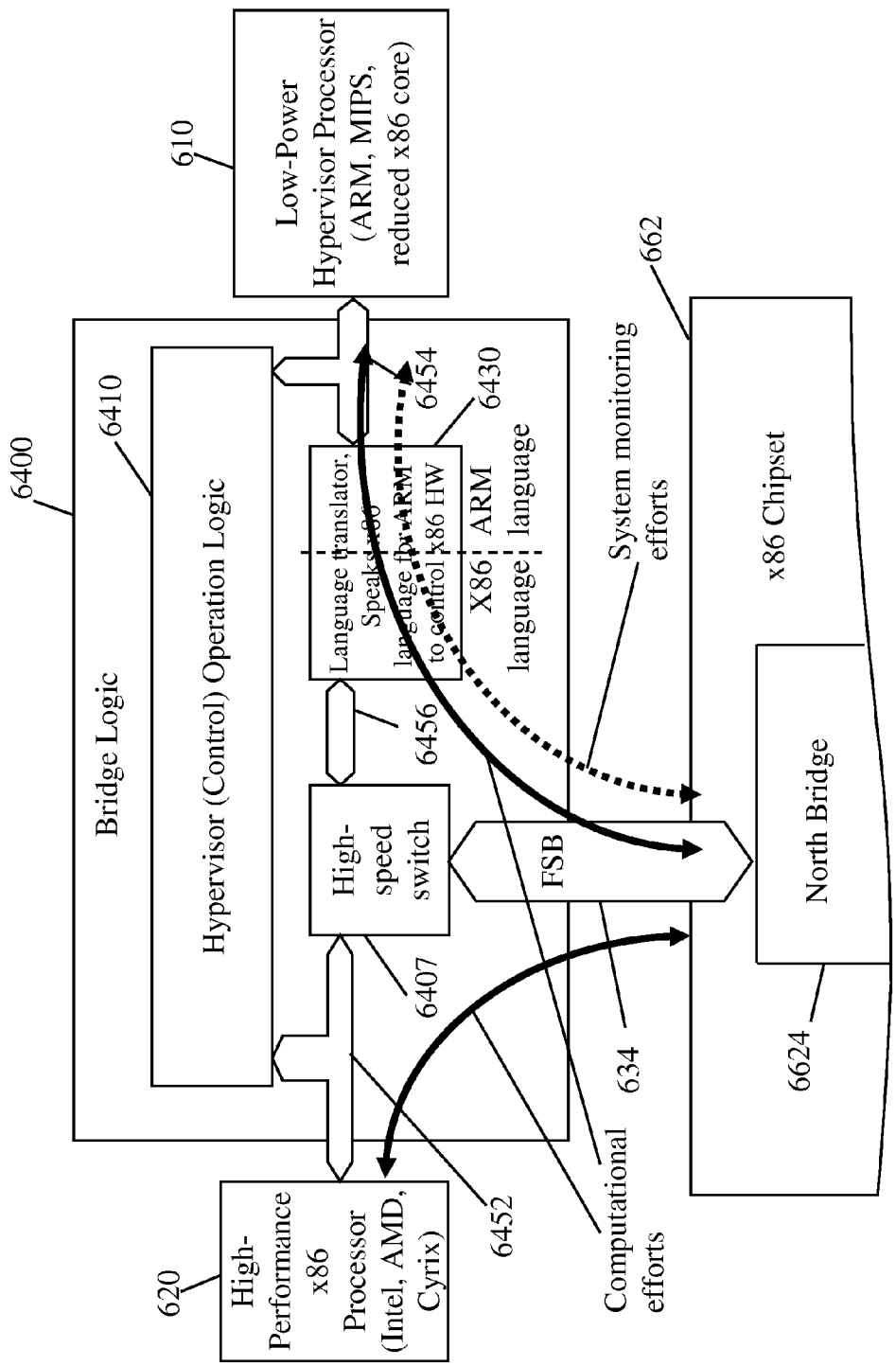

All embodiments of the inventive heterogeneous computer system described above in FIGS. 8-12 operate in one of three modes illustrated in FIGS. 13-15. This first mode illustrated in FIG. 13 is much like what a conventional desktop computer is doing. The performance x86 processor 620 may be assigned a complex processing power-demanding CAD, or high-fidelity gaming job, in which the x86 processor 620 is working full load. Meanwhile, the hypervisor processor 610 is also active, monitoring and maintaining the computer system status so as to be ready for the performance x86 to be put to rest any time.

In the drawing, the double-head arrow pointing toward the processor 620 and the x86 chipset 662 along the FSB indicates that the processor 620 has its normal access to the x86 system. Meanwhile, the phantom-lined double-head arrow pointing toward the hypervisor processor 610 and the x86 chipset 662 along the FSB indicates that the hypervisor 610 is maintaining its monitoring of the entire system.

Heterogeneous computer system operation mode 2 illustrated in FIG. 14 signifies a scenario of, for example, an x86-based smart mobile device capable of cellular application made possible by the on-board hypervisor ARM processor. When such a smart device makes a cell call using its ARM, the performance x86 processor can be put to rest, as signified by the phantom processor 620.

Heterogeneous computer system operation mode 3 illustrated in FIG. 15 signifies a scenario of, for example again, an x86-based smart mobile device that is simultaneously making a cell call using its ARM and making an Active-X-required remote banking Windows application out on the road. In this case the hypervisor processor 610 is active and performing its light communications task while simultaneously monitoring and maintaining system status. On the other hand, the performance x86 processor 620 is also active to perform its assigned remote banking task. Both ARM and x86 applications respectively under Android (for example) and Windows OS are performed at the same time, on the same heterogeneous computer system display screen, and can even exchange data to each other—a mixed-OS software application scenario performed seamlessly and simultaneously integrated on the same hardware as will be described below.

C: Boot Up Algorithm for the Heterogeneous Computer System

FIGS. 16-19 respectively illustrate the control algorithms for bringing up the heterogeneous computer system. Four routes are possible to bring up the inventive computer system from the status of power down:

Mode A: Only the low-power hypervisor processor system is booted up active.

Mode B: Performance x86 processor boots up after hypervisor processor system is active.

Mode C: Only the performance x86 processor system is booted up active.

Mode D: Hypervisor processor system boots up after the performance x86 system is active.

Figure 16:
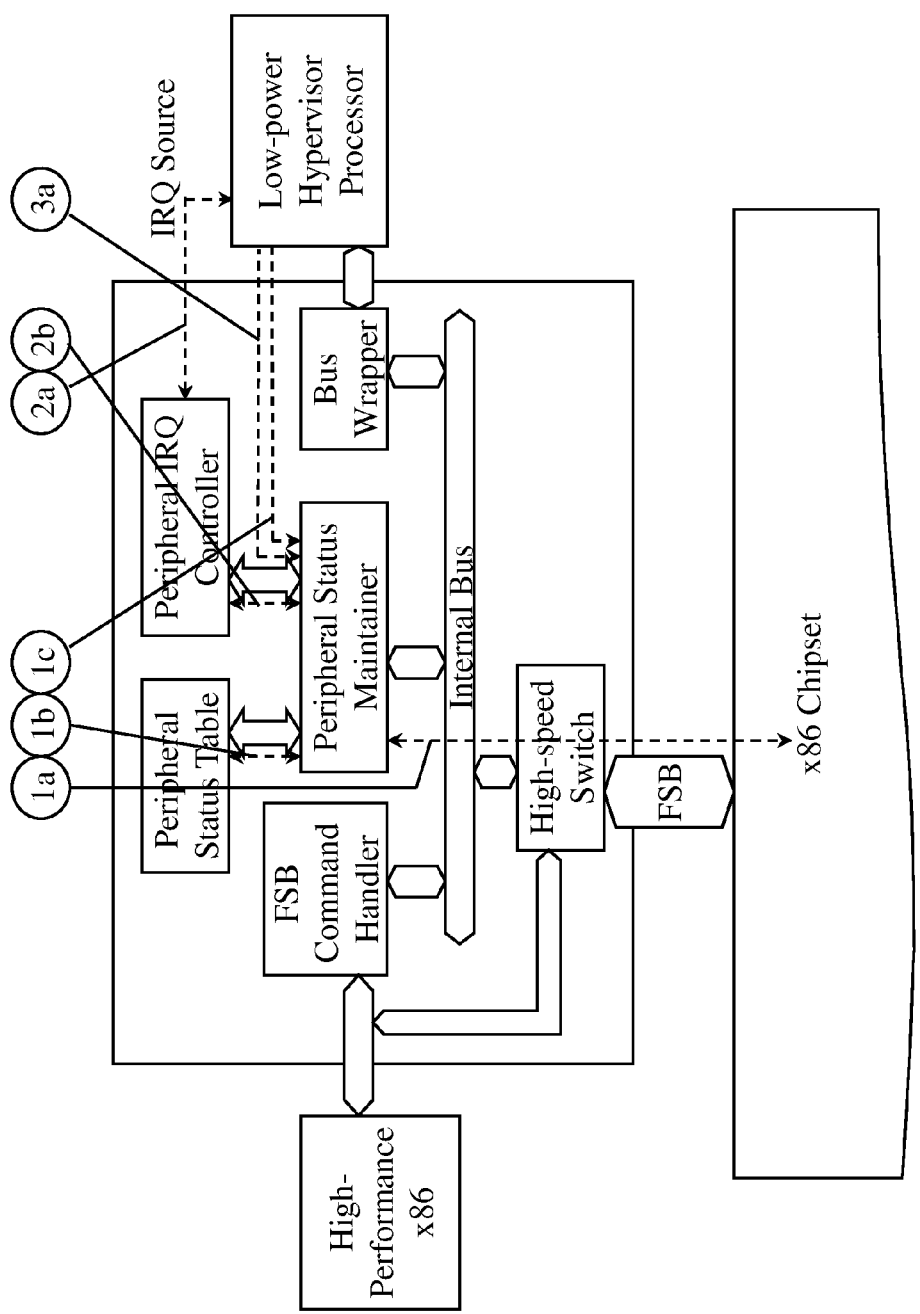
FIGS. 16-19 respectively illustrate the control algorithms for bringing up the heterogeneous computer system.

Mode A:

The sequence to boot up only the hypervisor processor is described in FIG. 16.

Step 1:

1a: First, the Peripheral Status Maintainer (PSM) accesses BIOS.

1b: Next, the peripheral list and mapping table are updated based on system BIOS information.

1c: Then, the low-power hypervisor boots, initiates peripherals on internal bus, and starts peripheral interrupt service.

Step 2:

2a: First, PSM sends IRQ to low-power hypervisor processor.

2b: Next, low-power hypervisor processor starts peripheral maintenance services.

Step 3:

3a: Low-power hypervisor processor initiates all peripherals connected to the system.

Figure 17:
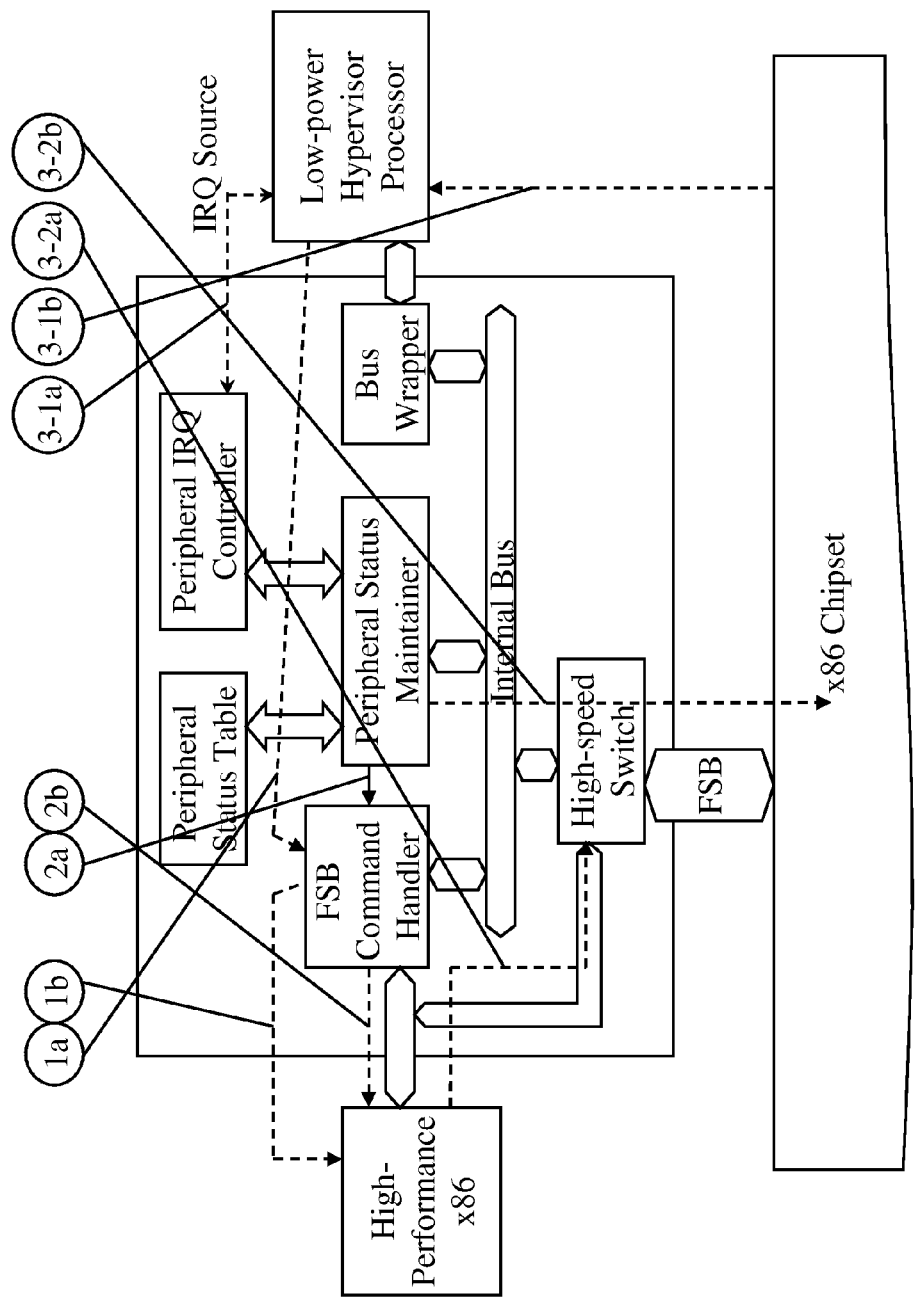

Mode B:

The sequence that performance x86 processor boots up after hypervisor processor system is active is described in FIG. 17.

Step 1:

1a: Low-power hypervisor sends power up signal to FSB Command Handler.

1b: FSB Command Handler sends reset instruction to performance x86.

Step 2:

2a: FSB Command Handler requests necessary system information from PSM (PSM presents itself as BIOS the x86 processor)

2b: FSB Command Handler provides necessary information to performance x86 processor during bootstrap of performance x86.

Step 3-1: Indirect Access 3-1a: Performance x86 sends FSB commands for indirect access.

3-1b: Low power hypervisor processor plays the role of a proxy, and executes high-speed x86 indirect access commands.

Step 3-2: Direct Access 3-2a: Performance x86 sends FSB commands for direct access.

3-2b: PSM monitors the direct access.

Figure 18:
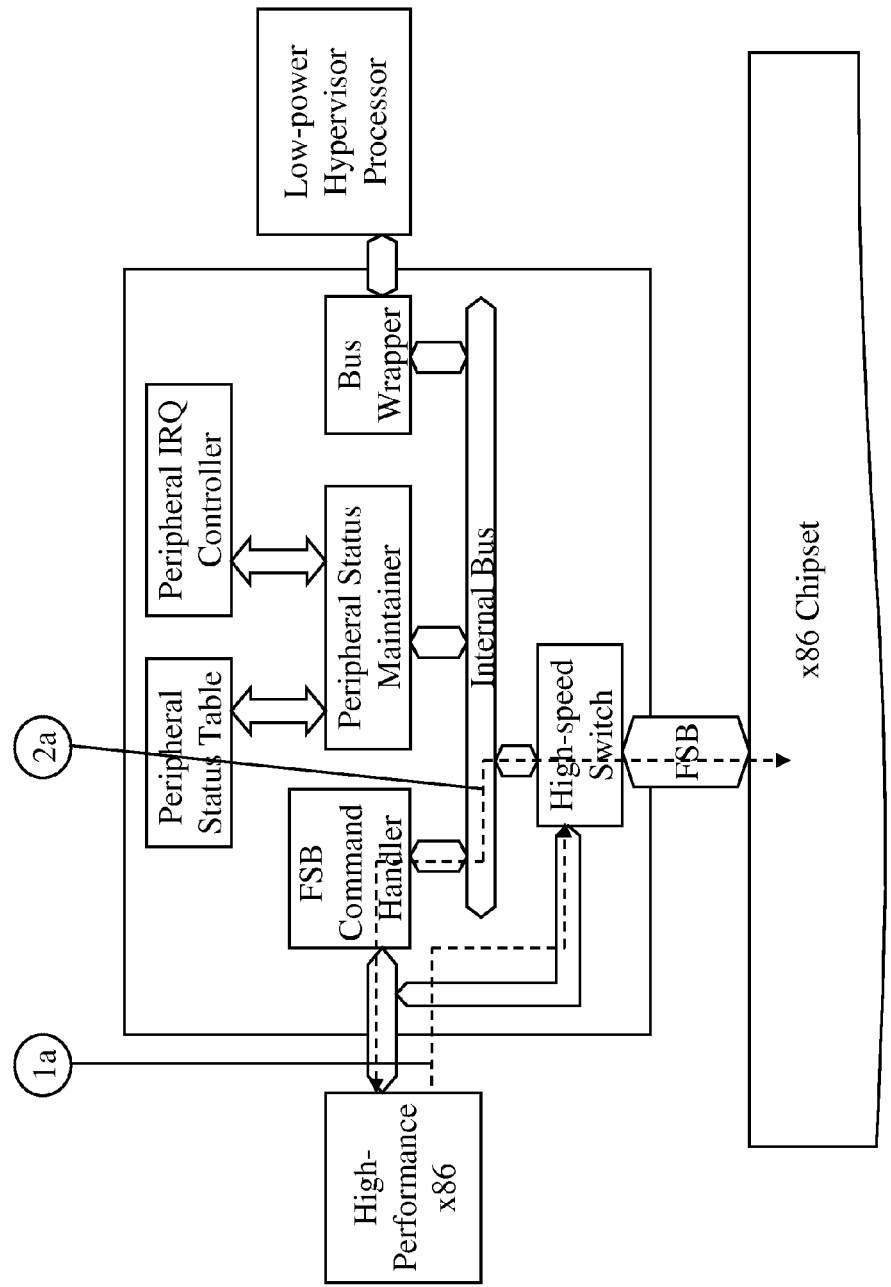

Mode C:

The sequence to boot up only the performance x86 processor is described in FIG. 18. This can be a default mode of power up if the hetero computer system powers up the performance x86 only, can be implemented in pure hardware, without any firmware control.

Step 1:

1a: High-speed data switch resets mode to act as a bypass hybrid bridge sub system. (This is the default mode if the hetero powers up the performance x86, first, and only, can be implemented in pure hardware, without any firmware control.)

Step 2:

2a: Performance x86 boots up normally.

Figure 19:
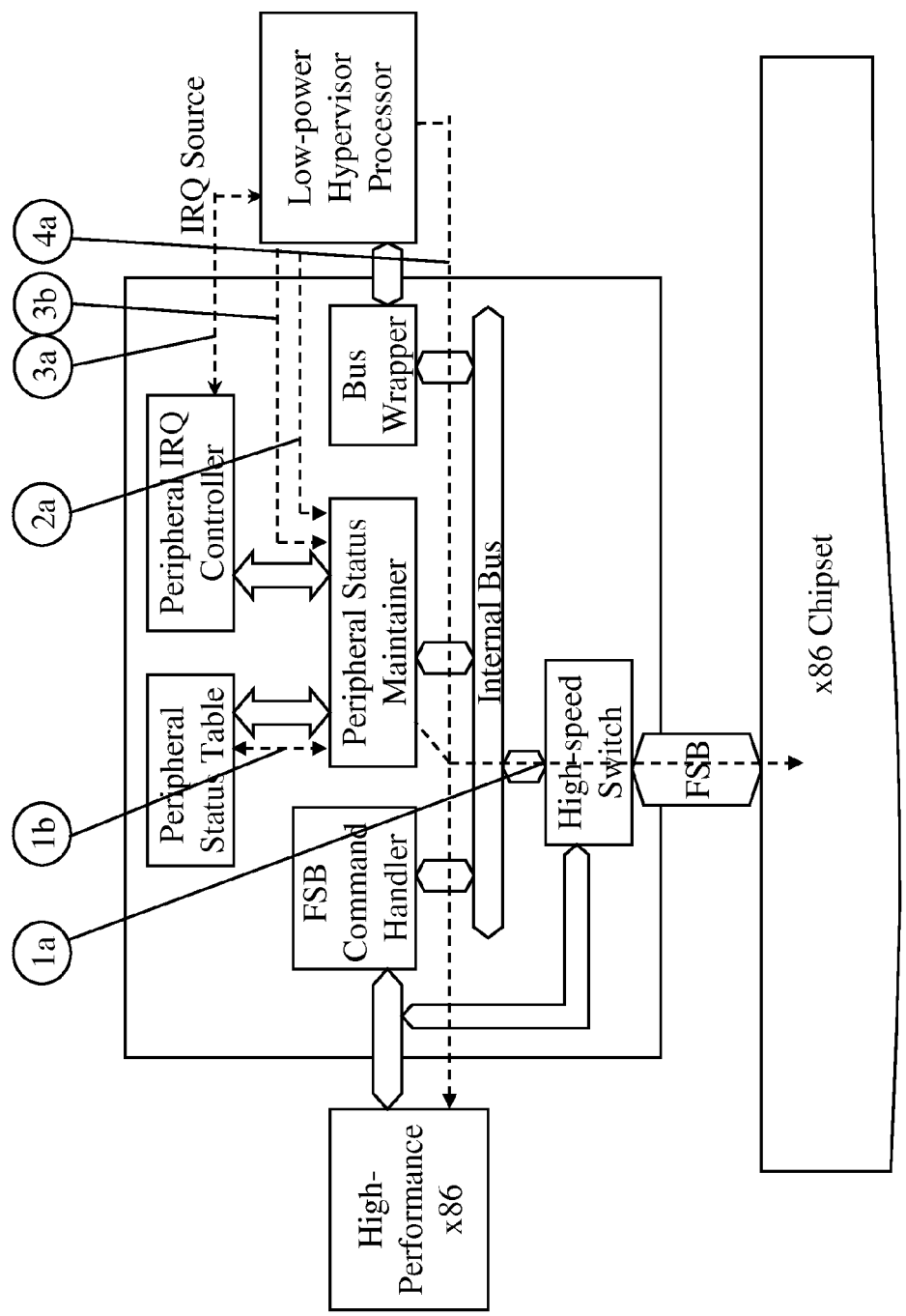

Mode D:

The sequence that hypervisor processor system boots up after the performance x86 system is active is described in FIG. 19.

Step 1:

1a: PSM synchronizes information with BIOS.

1b: PSM updates peripheral list and mapping table.

Step 2:

2a: Low-power hypervisor boots up, initiates peripherals connected to internal bus, and initiates interrupt services.

Step 3:

3a: PSM sends IRQ to low-power hypervisor.

3b: Low-power hypervisor starts peripheral maintenance services.

Step 4:

4a: Low-power hypervisor notifies and requests the Bridge Logic to take over system services.

D: Super Operating System for the Heterogeneous Computer System

From the software perspective, an implementation of the heterogeneous computer system of the present invention runs the original version of both x86 (such as Windows or Linux) and ARM (such as Android) OS's over a heterogeneous hypervisor layer in its software system. Function of this heterogeneous hypervisor layer is to make coexistence of two active OS's on the hardware of the inventive computer system possible and further to allow for seamless communication between the two OS's for simultaneous applications of both worlds.

To achieve this, experimental versions of the hetero hypervisor layer software for the popular OS's to work on the x86-ARM hetero have been created and tested successfully. Presently versions of the layer covering Windows for x86 and Android for ARM have been tested. A revised version of these test heterogeneous hypervisor layer software, literally a super OS, can be running the ARM and x86 processors on the entire heterogeneous computer system hardware in parallel and cross-supports software applications of the two different OS's.

Thus, on a heterogeneous computer system of the present invention two different OS's can boot up and run simultaneously, each supporting its own applications. Applications of one OS can even be run within the other OS, and two applications of different OS can talk to each other directly and seamlessly.

Figure 20:
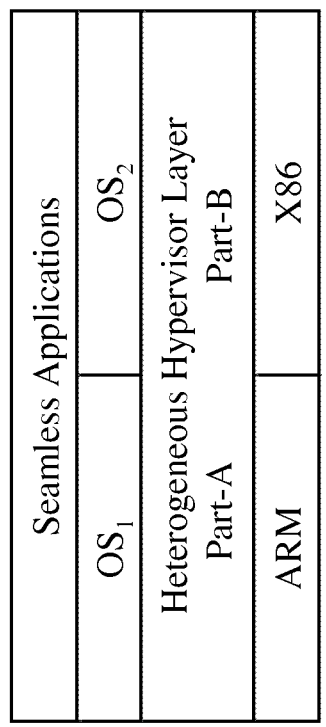
FIG. 20 schematically illustrates the super OS that operates the heterogeneous computer system for seamless cross-OS software application.

FIG. 20 schematically illustrates this super OS for the heterogeneous computer system of the present invention. Such an inventive Super OS places conventional OS, such as Windows, Linux, Solaris, Android for smart mobile devices etc. under itself as "sub-OS's." These conventional OS's need not be altered when operating under the Super OS. To these OS's, the heterogeneous computer system hardware that they each run on appears to be no different than the conventional x86 hardware they normally run. Once the Super OS boots up on the heterogeneous computer system, two different OS's can be alive on the same hardware simultaneously, supporting seamless multiple software applications of both OS at the same time and allows interchange of data in between.

For the construction of the Super OS, a heterogeneous hypervisor layer is created that is inserted between the OS and the hardware layers and spans across the two. With this software architecture of the inventive heterogeneous computer system technology, seamless cross-OS software application is possible. For example, a Windows Word can run directly within its Windows OS on the x86 hardware, or, the ARM processor can run Word via virtual computing across the heterogeneous hypervisor layer. To achieve this, full advantage of existing software technologies such as the open source virtual computing technology are taken.

FIGS. 21-24 respective illustrate the operating modes of the inventive heterogeneous computer system described in FIGS. 8-12 to support seamless cross-OS software application. Four modes the super OS of FIG. 20 boots and deploys itself include:

Mode A: Only the low-power hypervisor processor system is booted up active.

Mode B: Performance x86 processor boots up after hypervisor processor system is active.

Mode C: Only the performance x86 processor system is booted up active.

Mode D: Hypervisor processor system boots up after the performance x86 system is active.

Figure 21:
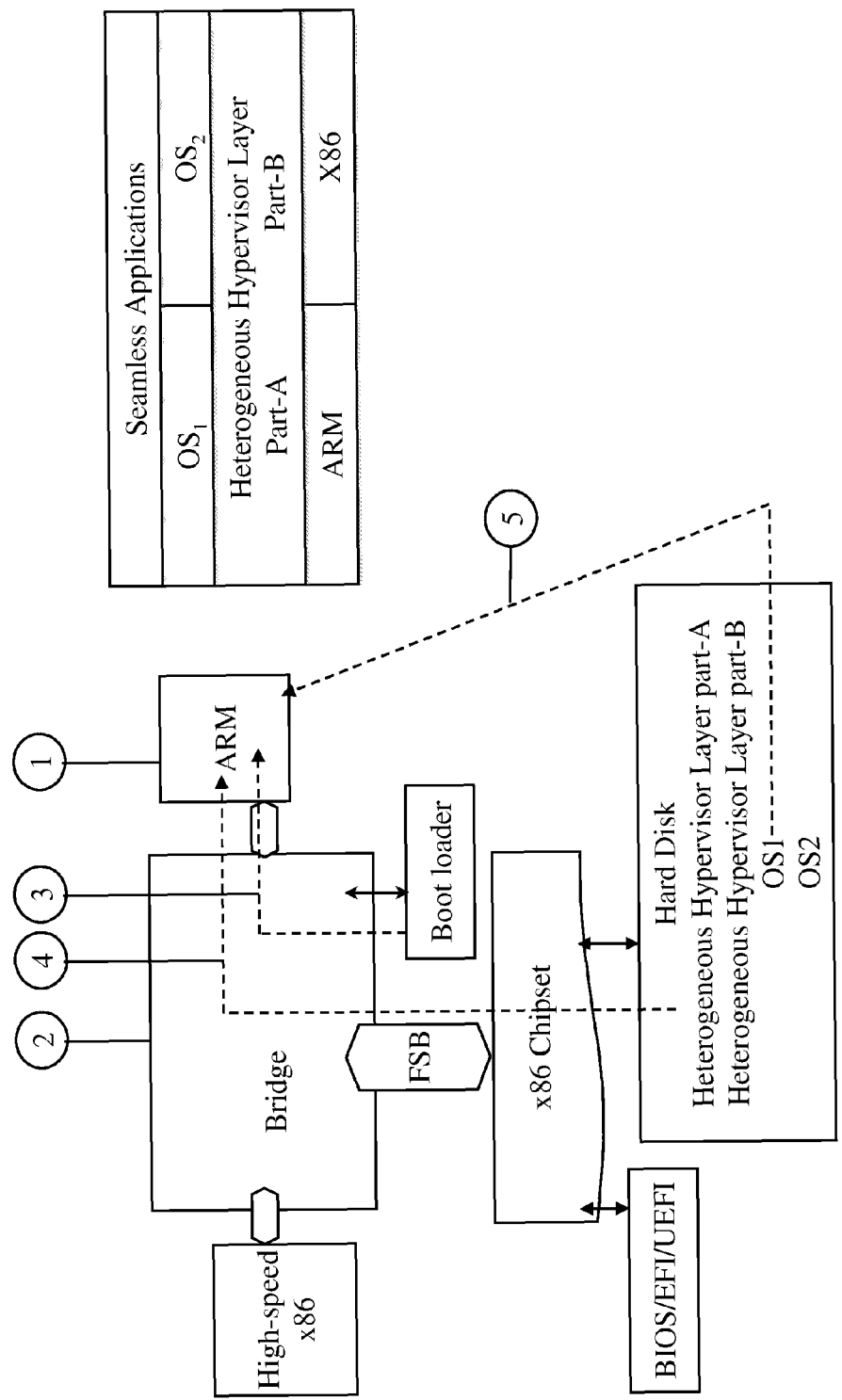
FIGS. 21-24 respective illustrate the operating modes of the inventive heterogeneous computer system described in FIGS. 8-12 to support seamless cross-OS software application.

The sequence to boot up only the hypervisor processor OS is described in FIG. 21. This mode operates the software applications for the hypervisor processor only. The boot up procedure readies the inventive heterogeneous computer system so that software applications, for example, Android or Linux can be executed. The booting sequence involves:

1. Hypervisor processor (ARM) powers on.
2. Bridge initializes all peripherals connected directly to itself such as working RAM (to be distinguished from computer peripherals normally attached to the South Bridge of the x86 chipset.
3. Hypervisor processor (ARM) loads boot loader.
4. Boot loader loads Heterogeneous Hypervisor Layer Part-A.
5. Heterogeneous Hypervisor Layer Part-A loads $OS_1$.

Figure 22:
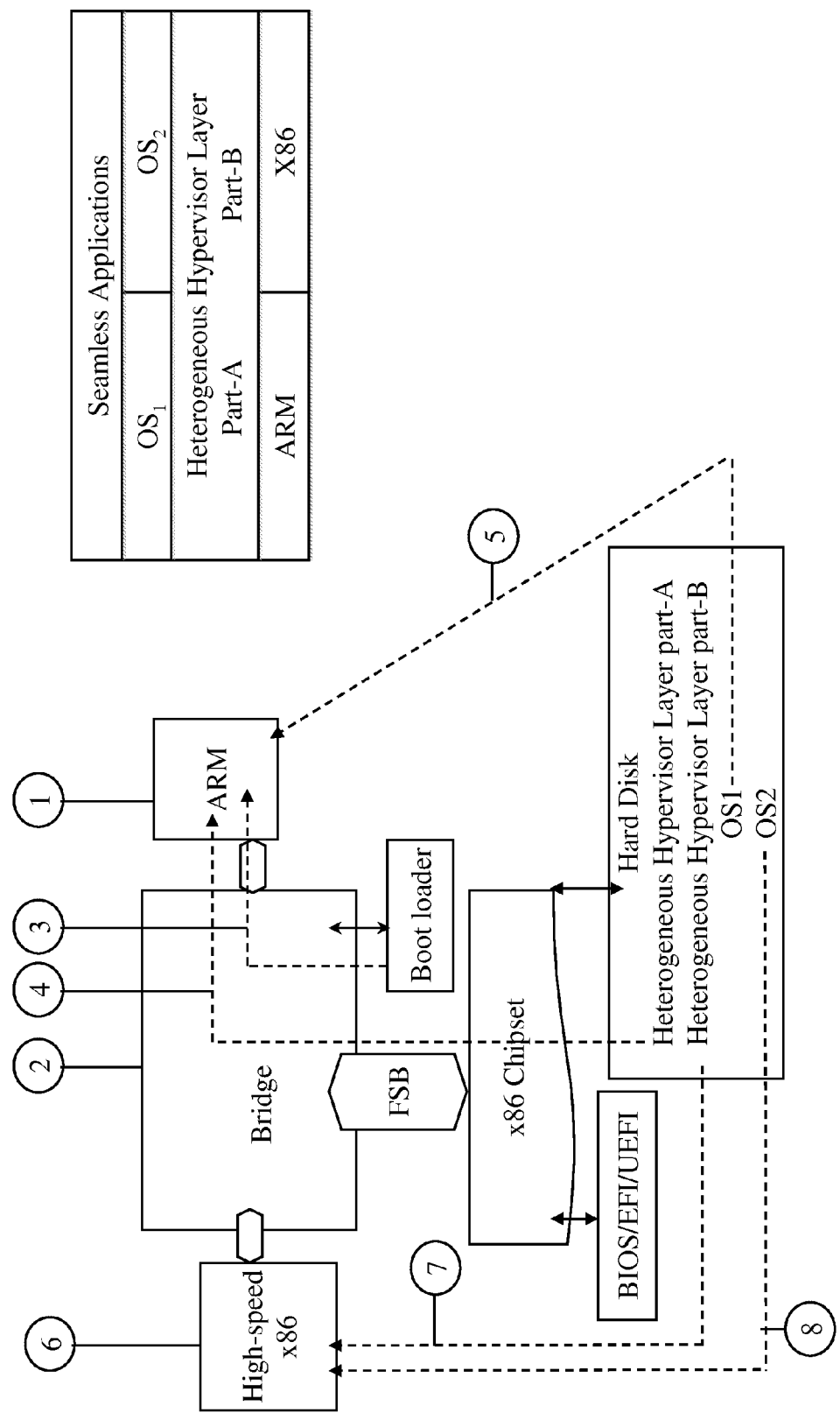

The sequence to boot up the performance x86 processor OS after the hypervisor processor OS is up is described in FIG. 22. This mode operates the software applications for the hypervisor and performance x86 processor OS's. The boot up procedure readies the inventive heterogeneous computer system so that simultaneous and seamless cross-OS software applications are possible. The booting sequence involves:

1. Hypervisor processor powers on.
2. Bridge initiates all peripherals connected directly to itself.
3. Hypervisor processor loads boot loader.
4. Boot loader loads Heterogeneous Hypervisor Layer Part-A.
5. Heterogeneous Hypervisor Layer Part-A loads $OS_1$.
6. Heterogeneous Hypervisor Layer Part-A powers on High-speed x86.
7. High-speed x86 loads Heterogeneous Hypervisor Layer Part-B.
8. Heterogeneous Hypervisor Layer Part-B loads $OS_2$.

Figure 23:
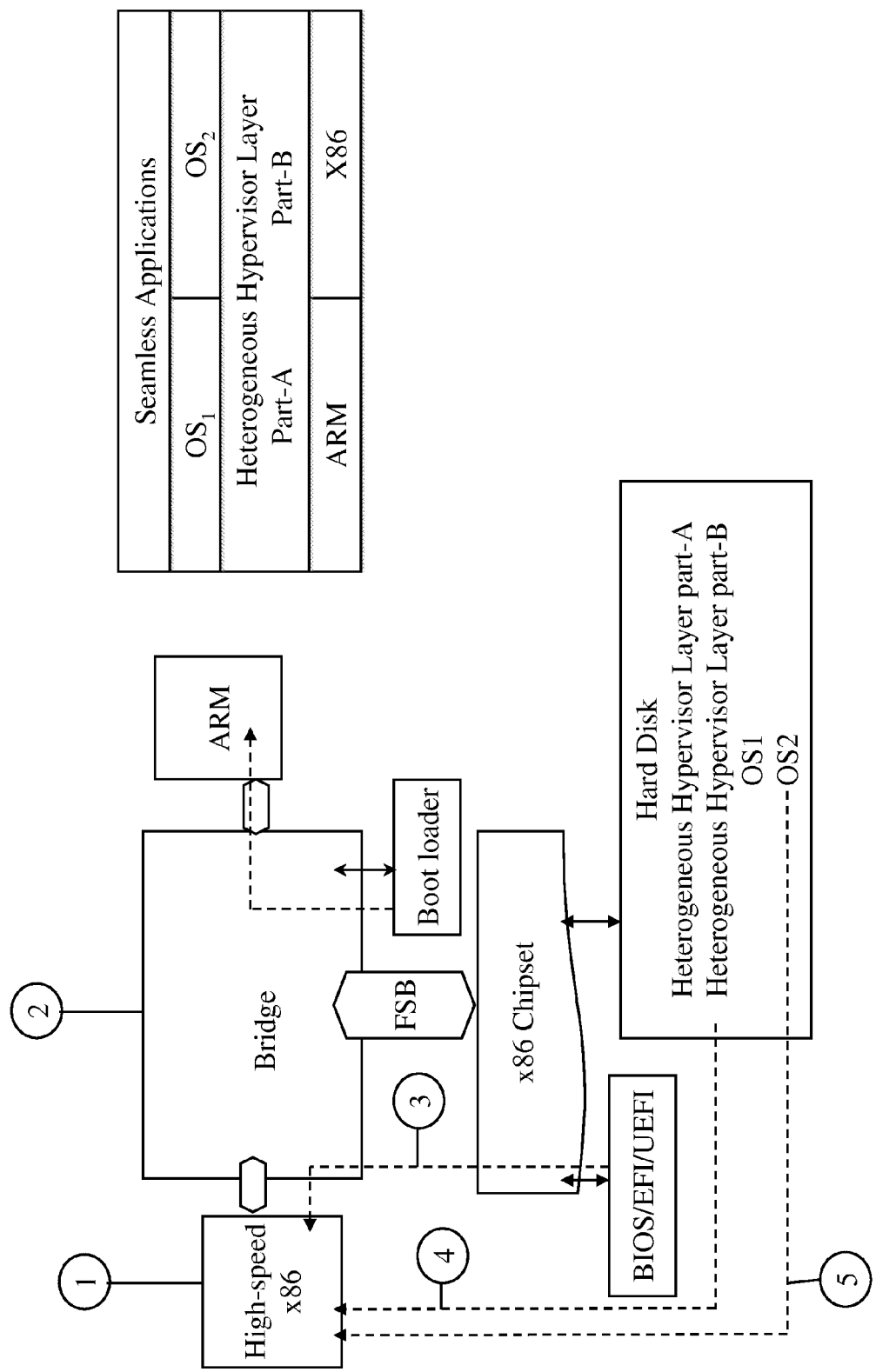

The sequence to boot up only the performance x86 processor OS is described in FIG. 23. The booting sequence involves:

1. Performance x86 powers on.
2. Bridge acts as a bypass hybrid bridge sub-system.
3. Performance x86 loads BIOS, EFI or UEFI.
4. Performance x86 loads Heterogeneous Hypervisor Layer Part-B.
5. Heterogeneous Hypervisor Layer Part-B loads $OS_2$.

Figure 24:
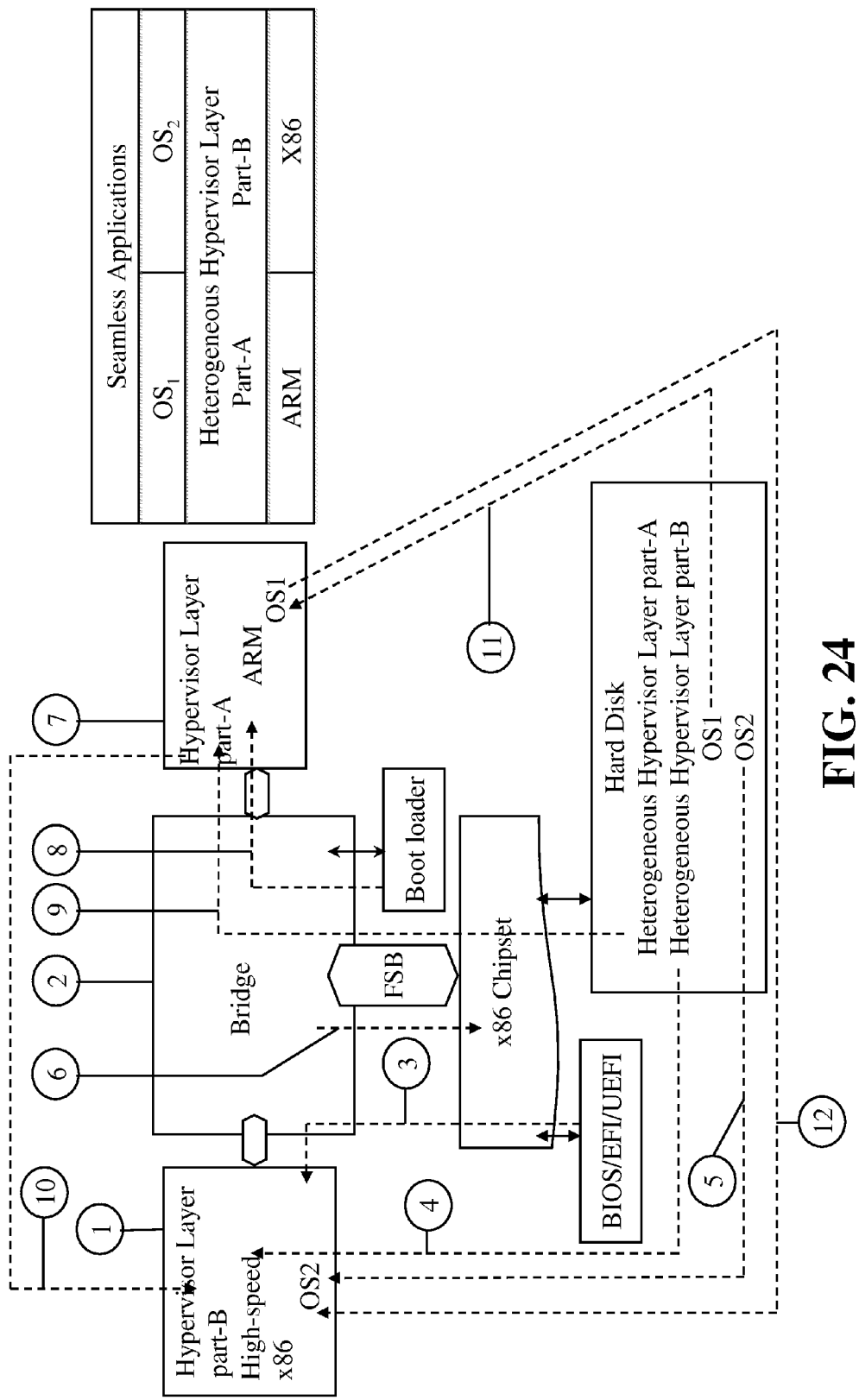

The sequence to boot up the hypervisor processor OS after the performance x86 processor OS is up is described in FIG. 24. This mode operates the software applications for the hypervisor and performance x86 processor OS's. The boot up procedure readies the inventive heterogeneous computer system so that simultaneous and seamless cross-OS software applications are possible. The booting sequence involves:

1. Performance x86 powers on.
2. Bridge acts as a bypass hybrid bridge sub-system.
3. Performance x86 loads BIOS or EFI or UEFI.
4. Performance x86 loads Heterogeneous Hypervisor Layer Part-B.
5. Heterogeneous Hypervisor Layer Part-B loads $OS_2$.
6. Bridge (PSM) synchronizes with BIOS and initiates all peripherals connected to itself except x86 chipset.
7. Heterogeneous Hypervisor Layer Part-B powers on hypervisor processor.
8. Hypervisor processor loads boot loader.
9. Boot loader loads Heterogeneous Hypervisor Layer Part-A.
10. Hypervisor Layer part-A notifies Hypervisor Layer part-B to take over Hypervisor services.
11. Heterogeneous Hypervisor Layer part-A loads $OS_1$.
12. $OS_1$ takes over system services.

While the above is a full description of the specific embodiments, various modifications, alternative constructions and equivalents may be used. Therefore, the above description and illustrations should not be taken as limiting the scope of the present invention.

What is claimed is:

1. In a heterogeneous computer system for executing software having at least one performance processor, an x86 chipset supporting said at least one performance processor for executing tasks of said software and a hypervisor processor consuming less power than said at least one performance processor, said x86 chipset comprising a north bridge, a bridge logic device comprising:
   a hypervisor operation logic maintaining status of said system under said at least one performance processor;
   a processor language translator logic translating between processor languages of said at least one performance and said hypervisor processors; and
   a high-speed bus switch having first, second and third ports for relaying data across any two of said three ports bidirectionally, wherein said first port is connected to said at least one performance processor via a first front-side bus, said second port is connected to said hypervisor processor via said processor language translator logic and a second front-side bus, and said third port is connected to said north bridge of said x86 chipset via a third front-side bus, wherein said at least one performance processor and said hypervisor processor all access said north bridge via said third front-side bus.

2. The bridge logic device of claim 1 wherein said hypervisor processor, supported by said x86 chipset and with said high-speed bus switch connecting across said second and third ports, executes tasks of said software said hypervisor processor has sufficient processing power to handle by using native language translated by said processor language translator logic and putting said at least one performance processor to a power-conserving state.

3. The bridge logic device of claim 1 wherein said hypervisor processor, using said maintained system status and with said high-speed bus switch connecting across said first and third ports, brings up said at least one performance processor out of said power-conserving state to execute tasks of said software said hypervisor processor has insufficient processing power to handle.

4. The bridge logic device of claim 1 wherein said at least one performance and hypervisor processors, with said high-speed bus switch connecting across said first, second and third ports correspondingly, simultaneously execute tasks of said software that require combined processing power of all processors.

5. The bridge logic device of claim 1 wherein said processor language translator logic further comprising:
   a peripheral interrupt request controller controlling interrupt requests by peripheral devices attached to said heterogeneous computer system;
   a peripheral status table keeping the status of said peripheral devices; and
   a peripheral status maintainer updating said status kept in said peripheral status table based on the control by said peripheral interrupt request controller.

6. The bridge logic device of claim 1 wherein said hypervisor operation logic further comprising:
   a front-side bus command handler monitoring computer commands performed by said at least one performance processor for maintaining said system status; and
   a bus wrapper translating between languages of said at least one performance and hypervisor processors to allow for direct access by said hypervisor processor to said x86 chipset for executing tasks of said software.

7. The bridge logic device of claim 1 wherein each of said at least one performance processor and said hypervisor processor are x86 processors and are on the same semiconductor chip.

8. The bridge logic device of claim 1 wherein each of said at least one performance processor is an x86 processor, said hypervisor processor is an ARM processor and all are on the same semiconductor chip.

9. The bridge logic device of claim 1 wherein said bridge logic device is on an independent semiconductor chip.

10. The bridge logic device of claim 1 wherein said bridge logic device is on the same semiconductor chip as that of said hypervisor processor.

11. The bridge logic device of claim 1 wherein said bridge logic device, said hypervisor processor and said at least one performance processor are on the same semiconductor chip.

* * * * *